(12) United States Patent
Koike et al.

(10) Patent No.: US 10,804,733 B2
(45) Date of Patent: Oct. 13, 2020

(54) POWER SUPPLY SYSTEM AND METHOD FOR CONTROLLING SAME

(71) Applicant: NISSAN MOTOR CO., LTD., Kanagawa (JP)

(72) Inventors: Tomoyuki Koike, Kanagawa (JP); Akifumi Koishi, Kanagawa (JP); Masahiko Tahara, Kanagawa (JP); Munemitsu Watanabe, Kanagawa (JP); Atsushi Tezuka, Kanagawa (JP); Terumasa Tsuchiya, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/069,477

(22) PCT Filed: Jan. 10, 2017

(86) PCT No.: PCT/JP2017/000462
§ 371 (c)(1),
(2) Date: Jul. 11, 2018

(87) PCT Pub. No.: WO2017/122631
PCT Pub. Date: Jul. 20, 2017

(65) Prior Publication Data
US 2019/0044367 A1    Feb. 7, 2019

(30) Foreign Application Priority Data
Jan. 12, 2016    (JP) ................. 2016-003702

(51) Int. Cl.
*H02J 7/14*    (2006.01)
*H02P 9/04*    (2006.01)
(Continued)

(52) U.S. Cl.
CPC ....... *H02J 7/1423* (2013.01); *H01M 10/0525* (2013.01); *H01M 10/06* (2013.01);
(Continued)

(58) Field of Classification Search
CPC ...... H02J 7/1423; H01M 10/06; H01M 10/46; H01M 10/0525
See application file for complete search history.

(56) References Cited

U.S. PATENT DOCUMENTS

| | | | |
|---|---|---|---|
| 6,366,055 B1 | 4/2002 | Ookoshi et al. | |
| 2004/0053083 A1 | 3/2004 | Kobayashi et al. | |

(Continued)

FOREIGN PATENT DOCUMENTS

| | | |
|---|---|---|
| CN | 1495065 A | 5/2004 |
| CN | 105083040 A | 11/2015 |

(Continued)

*Primary Examiner* — Richard Isla
*Assistant Examiner* — Johali A Torres Ruiz
(74) *Attorney, Agent, or Firm* — Osha Liang LLP

(57) ABSTRACT

A power supply system that is mountable on a vehicle has a lead-acid storage battery connected to an electrical load, a lithium-ion storage battery having different charge and discharge characteristics form the lead-acid storage battery, and connected in parallel with the lead-acid storage battery with respect to the electrical load, a power generator configured to charge the lead-acid storage battery and the lithium-ion storage battery, and a controller configured to drive the power generator based on a relationship between a discharge current of the lead-acid storage battery and a discharge current of the lithium-ion storage battery.

8 Claims, 16 Drawing Sheets

(51) Int. Cl.
  *H02J 1/10* (2006.01)
  *H01M 10/0525* (2010.01)
  *H01M 10/06* (2006.01)
  *H01M 10/46* (2006.01)
  *H02J 1/08* (2006.01)

(52) U.S. Cl.
  CPC .............. *H01M 10/46* (2013.01); *H02J 1/10* (2013.01); *H02J 7/14* (2013.01); *H02P 9/04* (2013.01); *H02J 1/082* (2020.01); *H02J 1/122* (2020.01)

(56) References Cited

U.S. PATENT DOCUMENTS

| | | | |
|---|---|---|---|
| 2007/0032915 A1* | 2/2007 | Yamaguchi | F02N 11/0866 701/1 |
| 2011/0001352 A1* | 1/2011 | Tamura | B60L 7/12 307/9.1 |
| 2011/0198920 A1* | 8/2011 | Komuro | B60R 25/00 307/10.1 |
| 2011/0260544 A1 | 10/2011 | Imai et al. | |
| 2012/0293114 A1 | 11/2012 | Murochi et al. | |
| 2014/0015534 A1 | 1/2014 | Katayama et al. | |
| 2014/0191576 A1 | 7/2014 | Honda et al. | |
| 2014/0265558 A1* | 9/2014 | Katayama | B60R 16/033 307/10.1 |
| 2015/0329007 A1 | 11/2015 | Matsunaga et al. | |
| 2017/0136968 A1* | 5/2017 | Mukuno | H01M 10/46 |
| 2017/0141589 A1* | 5/2017 | Inoue | H02J 7/1423 |

FOREIGN PATENT DOCUMENTS

| | | |
|---|---|---|
| EP | 1138554 A2 | 10/2001 |
| JP | 2011-234479 A | 11/2011 |
| JP | 2014-18018 A | 1/2014 |
| JP | 2014-034288 A | 2/2014 |
| JP | 2015-050009 A | 3/2015 |
| WO | 2012/165340 A1 | 12/2012 |

\* cited by examiner

POWER SUPPLY SYSTEM AND METHOD FOR CONTROLLING SAME

CROSS-REFERENCE TO RELATED APPLICATIONS

The present application claims priority to Japanese Patent Application No. 2016-003702 filed with the Japan Patent Office on Jan. 12, 2016, the contents of which are hereby incorporated by reference in its entirety.

BACKGROUND

Technical Field

The present invention relates to a power supply system including two types of secondary batteries that differ in durability against repetition of charge and discharge, and to a method for controlling the same.

Related Art

JP 2011-234479A discloses an electrical circuit for a vehicle including a lead-acid storage battery (hereinafter also referred to as a "lead-acid battery") and a lithium-ion battery. This electrical circuit is configured such that when automatically restarting an engine from idling stop, the power supply voltage of the vehicle drops momentarily due to high current that flows through a starter motor, and therefore, in terms of protection of part of vehicle electrical equipment loads provided on the lithium-ion battery side, energization to the starter motor from the lithium-ion battery is interrupted and electric power is supplied to the starter motor only from the lead-acid storage battery.

SUMMARY OF INVENTION

In the meantime, in an electrical circuit including two different types of secondary batteries, i.e. a lead-acid battery and a lithium-ion battery, like the electrical circuit of the above-described document, the charge timing of the lead-acid battery and the lithium-ion battery is normally determined so that the discharge current of the lead-acid battery for an electrical load (hereinafter also referred to simply as a "load") becomes equal to or less than a predetermined threshold value. That is, when the discharge current of the lead-acid battery becomes greater than the predetermined threshold value, a power generator is driven by a control device so that each battery shifts from the discharge phase to the charge phase.

However, in the power supply system that shifts from the discharge phase to the charge phase based on the discharge current value of the lead-acid battery, when the lead-acid battery is as good as new, the charge request SOC of the lithium-ion battery cannot be set low. That is, in the conventional power supply system, the lithium-ion battery can be used only to an SOC lower limit value restricted by the lead-acid discharge that is higher than an SOC lower limit value restricted by the lithium-ion battery itself.

Therefore, when the lead-acid battery is degraded so that it is not possible to sufficiently discharge current from the lead-acid battery in the discharge phase, the discharge current from the lithium-ion battery increases correspondingly. In such a state, the SOC of the lithium-ion battery decreases early to the SOC lower limit value restricted by the lead-acid discharge, and as a result, the charge and discharge of the lithium-ion battery and the lead-acid battery are repeated in a short time.

On the other hand, when the charge request SOC of the lithium-ion battery is set to the SOC lower limit value restricted by the lithium-ion battery itself, when the lead-acid battery is new, a state in which the discharge current of the lead-acid battery is large lasts for a long time to facilitate (promote) degradation of the lead-acid battery.

According to one or more embodiments of the present invention, a power supply system that can effectively use an SOC of a lithium-ion battery while suppressing degradation of a lead-acid battery, the power supply system including two types of batteries that differ in durability against repetition of charge and discharge, and being mountable on a vehicle, and a method for controlling such a power supply system.

Acceding to one or more embodiments of the present invention, a power supply system that includes two secondary batteries having different charge and discharge characteristics and is mountable on a vehicle. The power supply system has a lead-acid storage battery connected to an electrical load; a lithium-ion storage battery connected in parallel with the lead-acid storage battery with respect to the electrical load; a power generator configured to charge the lead-acid storage battery and the lithium-ion storage battery; and a control unit configured to drive the power generator based on a relationship between a discharge current of the lead-acid storage battery and a discharge current of the lithium-ion storage battery.

DETAILED DESCRIPTION

Hereinafter, embodiments of the present invention will be described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
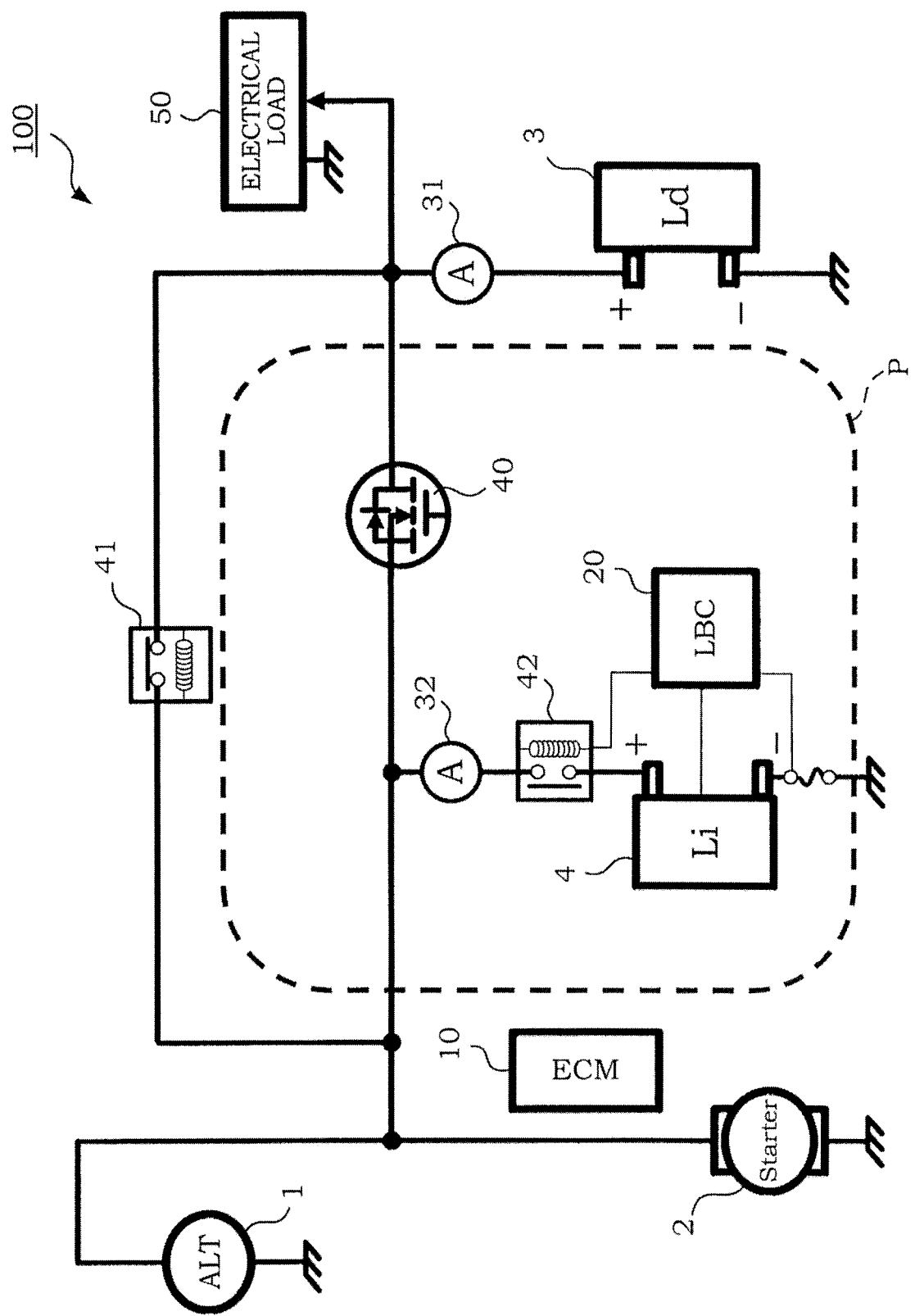
FIG. 1 is a block diagram showing the overall configuration of a power supply system in a first embodiment of the present invention.

FIG. 1 is a block diagram showing the overall configuration of a power supply system 100 in the first embodiment of the present invention. The power supply system 100 of the first embodiment is a power supply system that includes two secondary batteries having different charge and discharge characteristics and is mountable on a vehicle. The power supply system 100 is applied to, for example, a vehicle or the like that is equipped with an engine having a stop-start system.

As shown in FIG. 1, the power supply system 100 includes a lead-acid battery (lead-acid storage battery) 3 and a lithium-ion battery (lithium-ion secondary battery) 4 that are connected in parallel with respect to an electrical load 50. Further, the power supply system 100 includes an alternator (power generator) 1, a starter 2, a lithium-ion battery controller (hereinafter referred to as an "LBC") 20 that controls the lithium-ion battery 4, and an engine control module (hereinafter referred to as an "ECM") 10 that controls the entire power supply system 100.

In the first embodiment, a portion surrounded by a dotted line is integrally formed as a lithium-ion battery pack P. The lithium-ion battery pack P includes the lithium-ion battery 4, a lithium-ion battery accessory relay 42, a MOSFET 40, and the LBC 20. Further, in the first embodiment, a current sensor 32 that detects current charged to or discharged from the lithium-ion battery 4 is attached to the lithium-ion battery pack P.

In the first embodiment, the power supply system 100 includes a current sensor 31 that detects current charged to or discharged from the lead-acid battery 3, and the current sensor 32 that detects current charged to or discharged from the lithium-ion battery 4. Current value data detected by the current sensors 31, 32 are output to the ECM 10.

The power supply system 100 includes a lead-acid battery path relay 41 for directly connecting the lead-acid battery 3 to the alternator 1 and the starter 2. As shown in FIG. 1, the lead-acid battery 3 is connected to the lithium-ion battery 4 by a first path connected to the lithium-ion battery 4 via the MOSFET 40 and the lithium-ion battery accessory relay 42, and by a second path connected to the lithium-ion battery 4 via the lead-acid battery path relay 41 and the lithium-ion battery accessory relay 42.

The ECM 10 is formed by a microcomputer including a central processing unit (CPU), a read-only memory (ROM), a random access memory (RAM), and an input/output interface (I/O interface). The ECM 10 may alternatively be formed by a plurality of microcomputers.

The LBC 20 receives from the ECM 10 a signal indicative of a command for discharge to the starter 2 or the electrical load 50 or a charge command according to an operating condition of an engine not shown. Based on this signal, the LBC 20 performs on/off control of the lithium-ion battery accessory relay 42 and the MOSFET 40.

In the power supply system 100 of the first embodiment, the electrical load 50 is connected to the lead-acid battery 3 side with respect to the lead-acid battery path relay 41. The alternator 1 and the starter 2 are connected to the lithium-ion battery 4 side with respect to the lead-acid battery path relay 41.

The lead-acid battery path relay 41 is formed by a so-called normally closed type relay that is in an on-state (conducting state) when a coil is not energized. The lithium-ion battery accessory relay 42 is formed by a so-called normally open type relay that is in an off-state (non-conducting state) when a coil is not energized.

The MOSFET 40 is connected in such a way that the forward direction of its parasitic diode coincides with the direction from the lithium-ion battery 4 side toward the lead-acid battery 3 side. Consequently, regardless of the on/off state of the MOSFET 40, energization from the lead-acid battery 3 to the lithium-ion battery 4 in the first path is prevented.

The alternator 1 is driven by driving force of the engine to generate electric power. In generating the electric power, the power generation voltage is variably controlled by LIN (Local Interconnect Network) communication or hardwiring. The alternator 1 can also regenerate kinetic energy of the vehicle as electric power during deceleration of the vehicle. Control of such power generation and regeneration is performed by the ECM 10.

The starter 2 is provided near the junction between the engine and an automatic transmission not shown. Like a general starter for starting, the starter 2 includes a pinion gear that moves forward and backward. When the starter 2 is operated, the pinion gear engages with a gear provided on the outer periphery of a drive plate attached to a proximal end of a crankshaft, thereby performing cranking.

The internal resistance of the lithium-ion battery 4 is about 1/10 of the internal resistance of the lead-acid battery 3. Therefore, in the discharge phase of both batteries 3, 4, the discharge current of the lithium-ion battery 4 is greater than the discharge current of the lead-acid battery 3 at the initial stage. Then, while the discharge current of the lithium-ion battery 4 decreases as the remaining charge (SOC: State of Charge) of the lithium-ion battery 4 decreases, the discharge current of the lead-acid battery 3 increases according to a demand of the electrical load 50. Using time charts, a specific operation will be described later in detail.

Figure 2:
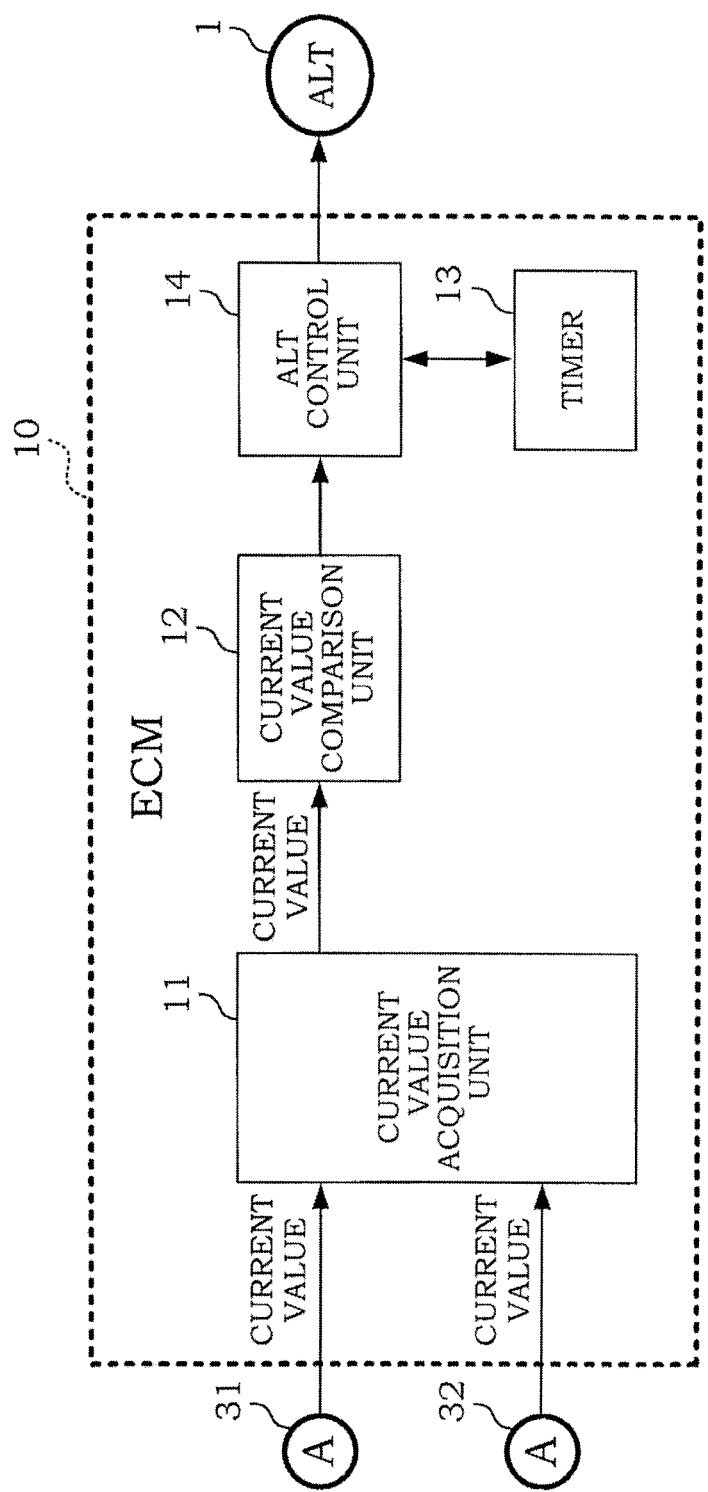
FIG. 2 is a block diagram showing one example of the functional configuration of an ECM that controls the entire power supply system in the first embodiment.
Figure 3:
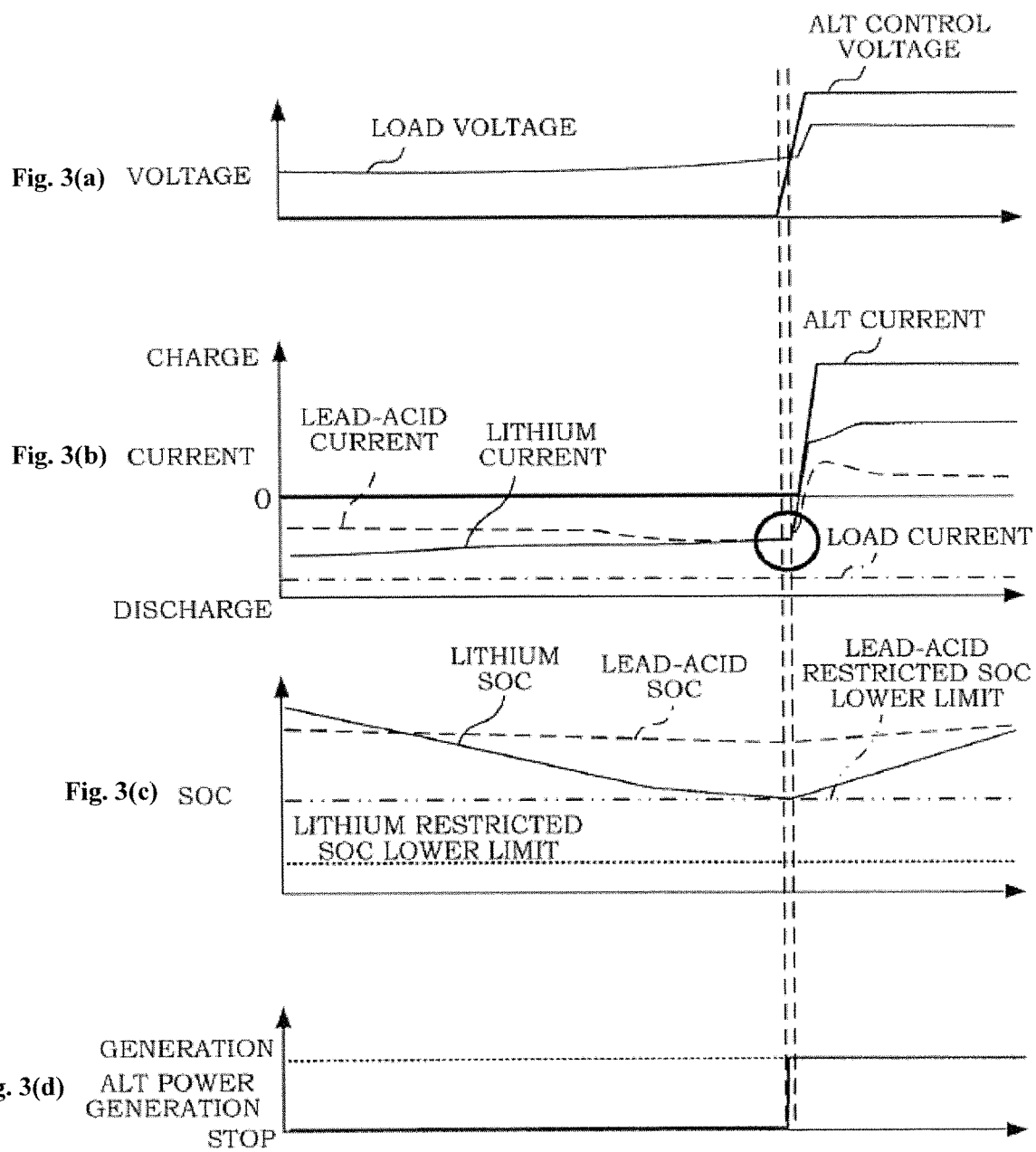
FIGS. 3(a)-3(d) are time charts showing changes of physical quantities when a lead-acid battery and a lithium-ion battery shift from the discharge phase to the charge phase in the case where the lead-acid battery is new, according to the first embodiment.
Figure 4:
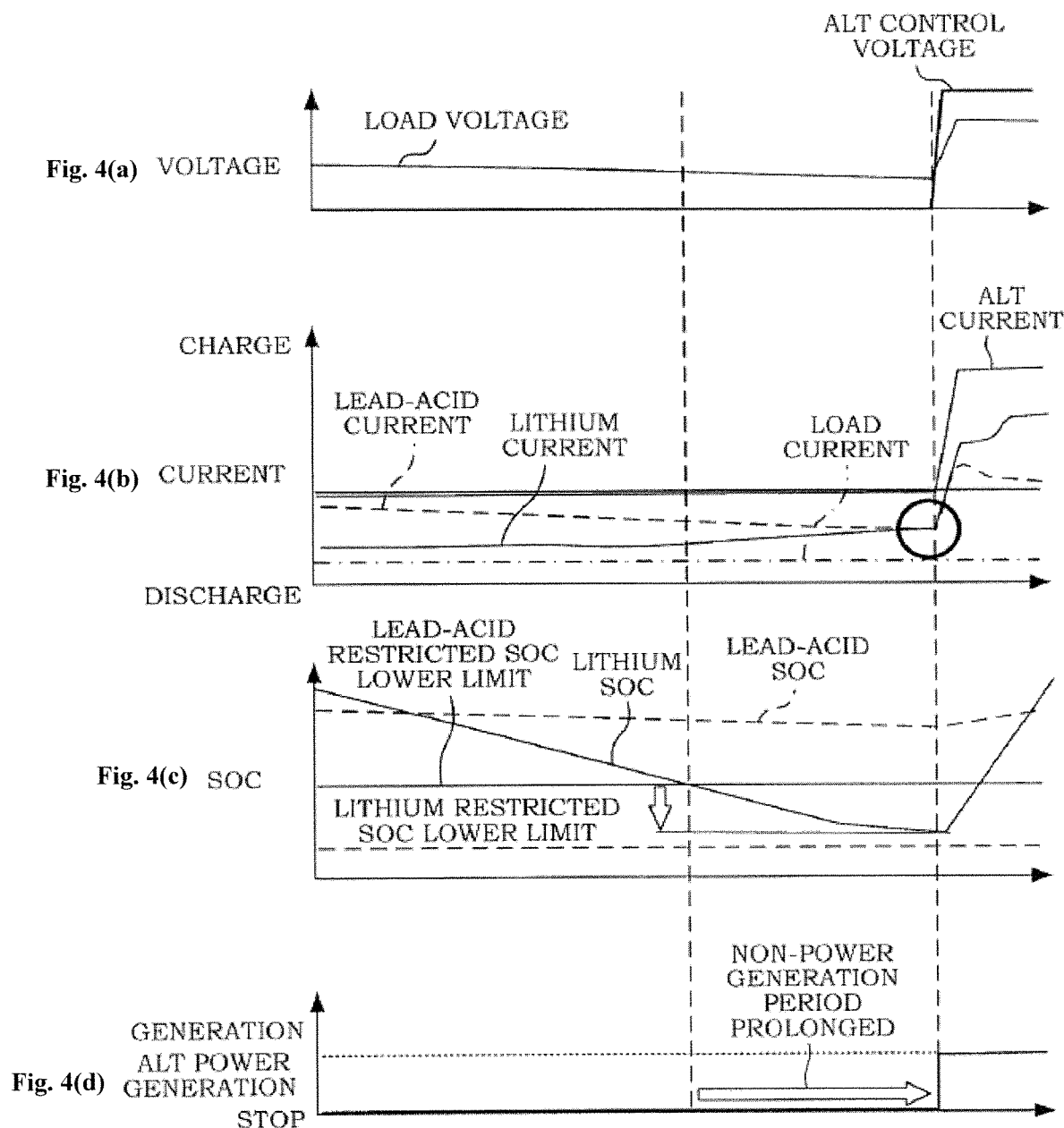
FIGS. 4(a)-4(d) are time charts showing changes of physical quantities when a lead-acid battery and a lithium-ion battery shift from the discharge phase to the charge phase in the case where the lead-acid battery is degraded, according to the first embodiment.

FIG. 2 is a block diagram showing one example of the functional configuration of the ECM 10 that controls the entire power supply system 100 in the first embodiment. In the first embodiment, the ECM 10 includes a current value acquisition unit 11, a current value comparison unit 12, a timer 13, and an ALT control unit 14.

The current value acquisition unit 11 is configured to acquire a discharge current of the lead-acid battery 3 detected by the current sensor 31 and a discharge current of the lithium-ion battery 4 detected by the current sensor 32. The acquired respective discharge current data (current values) are output to the current value comparison unit 12.

The current value comparison unit 12 is configured to compare the discharge current value of the lead-acid battery 3 and the discharge current value of the lithium-ion battery 4 acquired by the current value acquisition unit 11. The result of comparison by the current value comparison unit 12 is output to the ALT control unit 14. In the first embodiment, the current value comparison unit 12 calculates a ratio between the discharge current value of the lead-acid battery 3 and the discharge current value of the lithium-ion battery 4 and outputs the calculation result (current ratio) to the ALT control unit 14.

The timer 13 acquires a current time from a radio wave or a wireless network such as the Internet, not shown, and measures a control time in controlling the entire power supply system 100. In the first embodiment, the timer 13, cooperatively with the later-described ALT control unit 14, measures a time when the current ratio has become equal to or less than a predetermined value. The measurement result data (measured time) is output to the ALT control unit 14.

The ALT control unit 14 is configured to drive the alternator 1 to charge the lead-acid battery 3 and the lithium-ion battery 4 based on the comparison result of the current value comparison unit 12. In the first embodiment, the ALT control unit 14 determines whether or not the current ratio acquired from the current value comparison unit 12 has become equal to or less than the predetermined value. Then, based on the measured time of the timer 13, the ALT control unit 14 determines whether or not a predetermined time has elapsed from when the current ratio has become equal to or less than the predetermined value.

When the ALT control unit 14 has determined that the predetermined time has elapsed from when the current ratio has become equal to or less than the predetermined value, the ALT control unit 14 determines that it is timing to charge the lead-acid battery 3 and the lithium-ion battery 4, and drives the alternator 1.

Next, using time charts shown in FIGS. 3(a)-4(d), the operation of the power supply system 100 of the first embodiment will be described. These time charts respectively show a case where the lead-acid battery 3 is new and a case where the lead-acid battery 3 is degraded (e.g. sulfated or the like).

First, a description will be given of the case where the lead-acid battery 3 is new. FIGS. 3(a)-3(d) are time charts in the first embodiment showing changes of physical quantities when the lead-acid battery 3 and the lithium-ion battery 4 shift from the discharge phase to the charge phase in the case where the lead-acid battery 3 is new.

FIG. 3(a) shows the relationship between a load voltage that is applied to the electrical load 50 and an ALT control voltage that is output by the alternator 1. This voltage value is a system voltage and is substantially equal to a voltage obtained by subtracting an internal electromotive force of the lead-acid battery 3 from an open circuit voltage of the lead-acid battery 3, or a voltage obtained by subtracting an internal electromotive force of the lithium-ion battery 4 from an open circuit voltage of the lithium-ion battery 4. The current (system current) of the power supply system 100 is the sum of a discharge current of the lead-acid battery 3 and a discharge current of the lithium-ion battery 4. That is, the following formulas are established.

$$V_{system} = OCV_{Li} - I_{Li} \times R_{Li} = OCV_{PB} - I_{PB} \times R_{PB} \qquad (1)$$

$$I_{system} = I_{Li} + I_{PB} \qquad (2)$$

Herein, $V_{system}$ and $I_{system}$ represent a voltage and a current of the power supply system 100, $OCV_{Li}$ and $I_{Li}$ represent an open circuit voltage and a discharge current of the lithium-ion battery 4, $OCV_{PB}$ and $I_{PB}$ represent an open circuit voltage and a discharge current of the lead-acid battery 3, $R_{Li}$ represents an internal resistance of the lithium-ion battery 4, and $R_{PB}$ represents an internal resistance of the lead-acid battery 3.

As shown in FIG. 3(a), when the alternator 1 is driven, the alternator 1 starts power generation so that the ALT control voltage increases rapidly. With the increase of the ALT control voltage, the load voltage and the charge voltages of both batteries 3, 4 also increase.

FIG. 3(b) shows the relationship between charge/discharge currents of the lead-acid battery 3 and the lithium-ion battery 4, an ALT current that is output from the alternator 1, and a load current that is supplied to the electrical load 50. In order to facilitate description, it is assumed that the load current is constant in this time chart. As described above, when the ratio of the discharge currents of the lead-acid battery 3 and the lithium-ion battery 4 has become equal to or less than the predetermined value and then the predetermined time has elapsed, the ECM 10 shifts the phase from the discharge phase to the charge phase and drives the alternator 1 to start charging the lead-acid battery 3 and the lithium-ion battery 4 (circle mark in FIG. 3(b)).

As shown in FIG. 3(b), at the initial stage of the discharge phase, the discharge current of the lithium-ion battery 4 is greater than the discharge current of the lead-acid battery 3. This is because the internal resistance of the lithium-ion battery 4 is about ⅒ of the internal resistance of the lead-acid battery 3.

In the first embodiment, for example, 1.0 (i.e. when the discharge current of the lead-acid battery 3 becomes equal to or greater than the discharge current of the lithium-ion battery 4) is used as the predetermined value of the discharge current ratio, and, for example, 6 seconds is used as the predetermined time. These numerical values may be obtained in advance by experiments, simulations, or the like by taking into account the capacities of the lead-acid battery 3 and the lithium-ion battery 4, the overall configuration of the power supply system 100, and so on.

FIG. 3(c) shows the relationship between an SOC of the lead-acid battery 3 and an SOC of the lithium-ion battery 4. FIG. 3(d) shows power generation timing of the alternator 1. Conventionally, when the SOC of the lithium-ion battery 4 is reduced to an SOC lower limit value restricted by the discharge of the lead-acid battery 3 (e.g. 60%), the ECM 10 drives the alternator 1 to start charging the lead-acid battery 3 and the lithium-ion battery 4. In the first embodiment, as shown in FIG. 3(b), when the predetermined time has elapsed while the discharge current ratio is equal to or less than the predetermined value (hereinafter referred to as a "first condition"), the ECM 10 drives the alternator 1 to start charging the lead-acid battery 3 and the lithium-ion battery 4.

In this way, when the lead-acid battery 3 is new or as good as new, the charge and discharge of the lead-acid battery 3 and the lithium-ion battery 4 are repeated while the SOC of the lithium-ion battery 4 is not reduced to around an SOC lower limit value restricted by the lithium-ion battery 4 itself (e.g. 50%).

The alternator 1 is driven not only at the charge request timing of the lead-acid battery 3 and the lithium-ion battery 4, but also when, for example, the vehicle travels on a long downhill slope so that a command for regeneration by the alternator 1 is output from the ECM 10.

Next, a description will be given of the case where the lead-acid battery 3 is degraded. FIGS. 4(a)-4(b) are time charts in the first embodiment showing changes of physical quantities when the lead-acid battery 3 and the lithium-ion battery 4 shift from the discharge phase to the charge phase in the case where the lead-acid battery 3 is degraded. FIG. 4(a) to FIG. 4(d) respectively correspond to FIGS. 3(a) to 3(d).

In the conventional power supply system, the lead-acid battery 3 and the lithium-ion battery 4 shift from the discharge phase to the charge phase near a left vertical dashed line in FIG. 4(c). However, in the first embodiment, since the phase is shifted from the discharge phase to the charge phase based on the calculation result (current ratio) by the current value comparison unit 12, the period in which power generation by the alternator 1 is not performed (non-power generation period) can be prolonged as indicated by an arrow in FIG. 4(d).

Specifically, as shown in FIG. 4(b), when the lead-acid battery 3 is degraded, the discharge current from the lead-acid battery 3 becomes smaller than when the lead-acid battery 3 is new. Therefore, as shown in FIG. 4(c), the decreasing speed of the SOC of the lithium-ion battery 4 becomes a little faster.

When the current ratio of the discharge currents of the lead-acid battery 3 and the lithium-ion battery 4 has become equal to or less than the predetermined value and that state has lasted for the predetermined time, the ALT control unit 14 drives the alternator 1 to start charging the lead-acid battery 3 and the lithium-ion battery 4 as indicated by a circle mark in FIG. 4(b). As shown in FIG. 4(c), the SOC of the lithium-ion battery 4 can be used to a value that is lower than the SOC lower limit value restricted by the lead-acid battery 3.

In the example of FIGS. 4(a)-4(d), the case is shown where the phase is shifted from the discharge phase to the charge phase before the SOC of the lithium-ion battery 4 is reduced to the SOC lower limit value restricted by the lithium-ion battery 4 itself. However, when the SOC of the lithium-ion battery 4 reaches the SOC lower limit value restricted by the lithium-ion battery 4 itself before the conditions of the current ratio and the lasting time are established, the ALT control unit 14 drives the alternator 1 to charge the lead-acid battery 3 and the lithium-ion battery 4. However, since the SOC of the lithium-ion battery 4 can be used to an extent where the discharge current of the lithium-ion battery 4 decreases, it is possible to increase the usable SOC range of the lithium-ion battery 4 while suppressing excessive discharge of the lead-acid battery 3.

Figure 5:
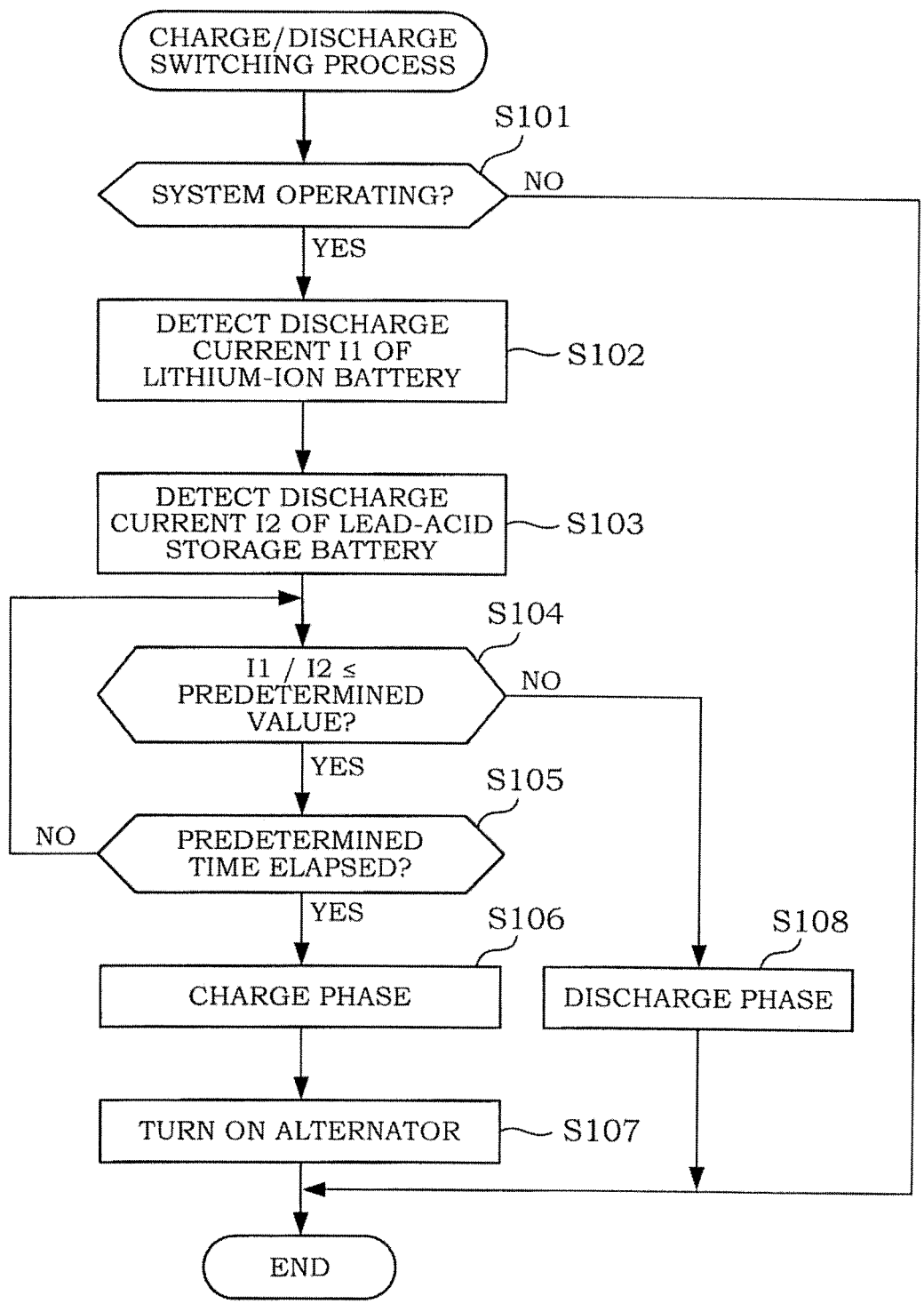
FIG. 5 is a flowchart showing one example of a charge/discharge switching process that is executed by the ECM of the power supply system of the first embodiment.
Figure 6:
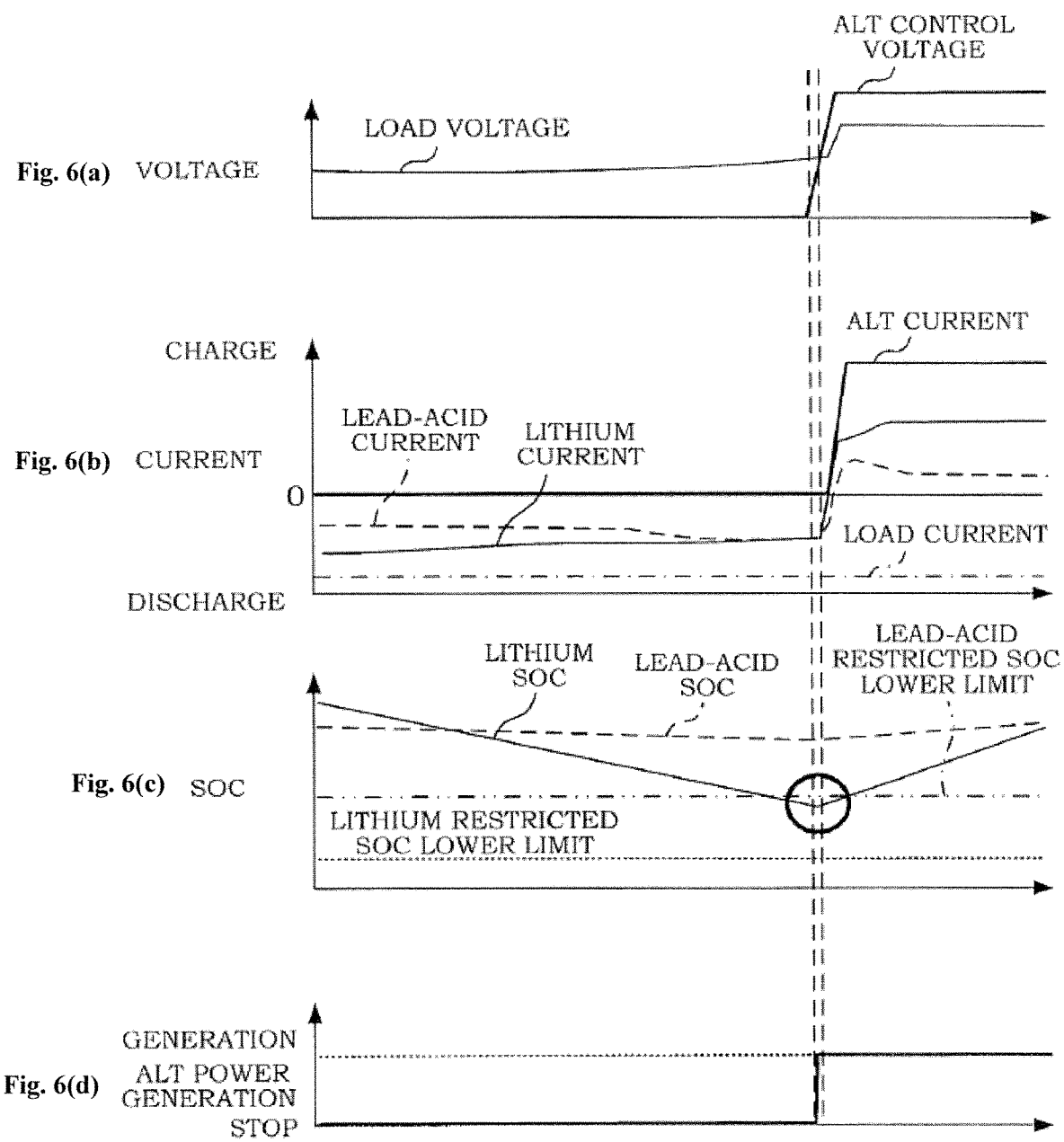
FIGS. 6(a)-6(d) are time charts in a comparative example showing changes of physical quantities when a lead-acid battery and a lithium-ion battery shift from the discharge phase to the charge phase in the case where the lead-acid battery is new.
Figure 7:
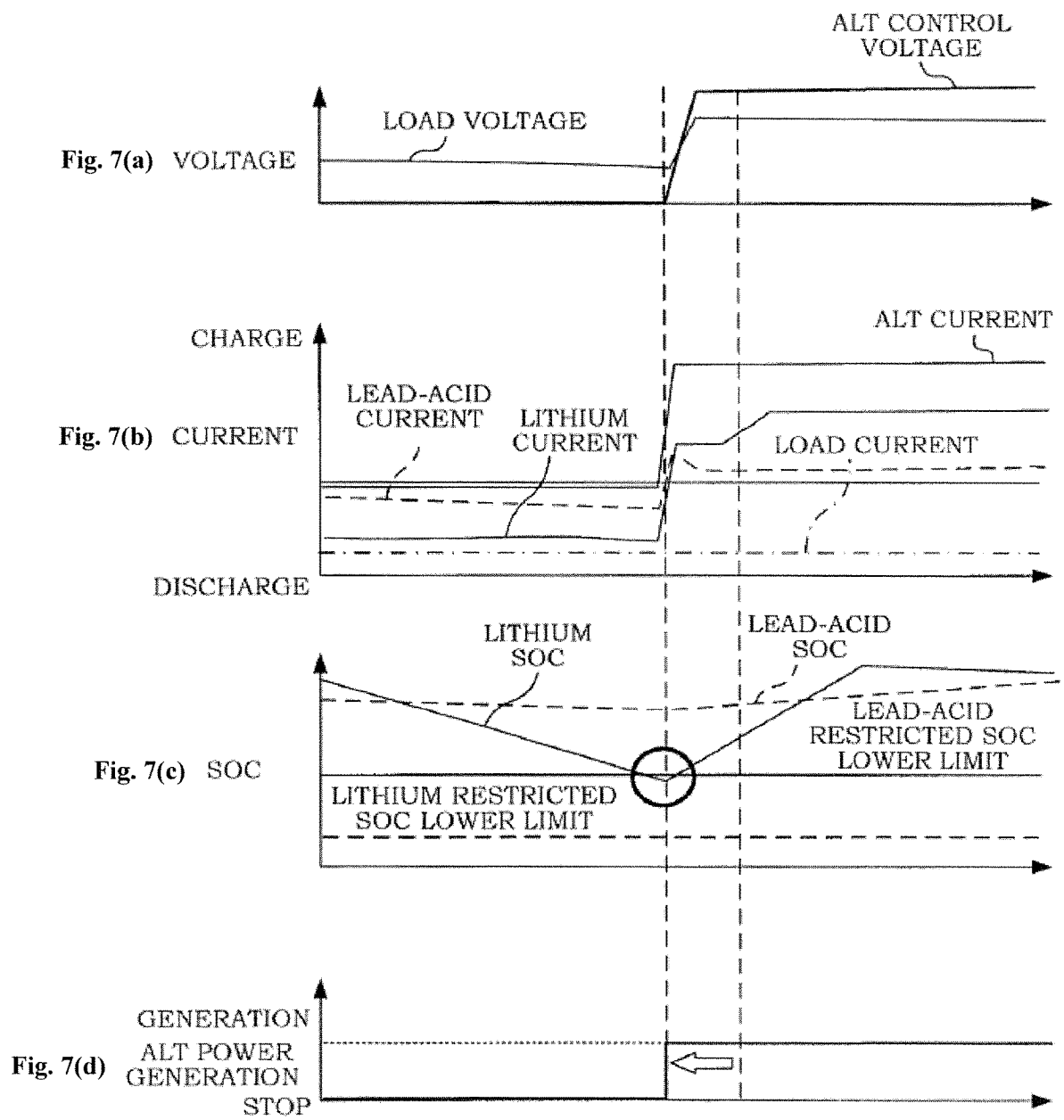
FIGS. 7(a)-7(d) are time charts in the comparative example showing changes of physical quantities when a lead-acid battery and a lithium-ion battery shift from the discharge phase to the charge phase in the case where the lead-acid battery is degraded.

Next, the operation of the power supply system 100 of the first embodiment will be described. FIG. 5 is a flowchart showing one example of a charge/discharge switching process that is executed by the ECM 10 of the power supply system 100 of the first embodiment. The charge/discharge switching process is executed at a predetermined time interval (e.g. every 10 milliseconds) while the vehicle equipped with the power supply system 100 is operating.

In the charge/discharge switching process, the ECM 10 first determines whether or not the power supply system 100 is operating (step S101). When the ECM 10 has determined that the power supply system 100 is not operating, the ECM 10 ends the charge/discharge switching process as it is.

On the other hand, when the ECM 10 has determined that the power supply system 100 is operating, the ECM 10 detects a discharge current I1 of the lithium-ion battery 4 using the current sensor 32 (step S102) and detects a discharge current I2 of the lead-acid battery 3 using the current sensor 31 (step S103). Then, the current value acquisition unit 11 acquires the discharge currents I1, I2.

Then, the current value comparison unit 12 of the ECM 10 calculates a current ratio I1/I2 as the ratio of the discharge currents and outputs the calculation result to the ALT control unit 14. The ALT control unit 14 determines whether or not the current ratio I1/I2 acquired from the current value comparison unit 12 is equal to or less than the predetermined value (step S104). When the ALT control unit 14 has determined that the current ratio I1/I2 is greater than the predetermined value, the ALT control unit 14 determines that the phase should still be the discharge phase (step S108), and ends the charge/discharge switching process as it is.

On the other hand, when the ALT control unit 14 has determined that the current ratio I1/I2 is equal to or less than the predetermined value, the ALT control unit 14, using the timer 13, measures an elapsed time from when the current ratio I1/I2 has become equal to or less than the predetermined value. Then, the ALT control unit 14 determines whether or not the elapsed time has reached the predetermined time (step S105). When the ALT control unit 14 has determined that the elapsed time has not reached the predetermined time, the ALT control unit 14 repeats determinations at steps S104 and S105. When the ALT control unit 14 has determined at step S104 that the current ratio I1/I2 has become greater than the predetermined value before the lapse of the predetermined time, the ALT control unit 14 determines that the phase should still be the discharge phase (step S108), and once ends the charge/discharge switching process.

When the ALT control unit 14 has determined at step S105 that the predetermined time has elapsed from when the current ratio I1/I2 has become equal to or less than the predetermined value, the ALT control unit 14 determines that the phase should be shifted to the charge phase (step S106), drives (turns on) the alternator 1 (step S107), and ends the charge/discharge switching process.

In addition to the condition of the current ratio, there is a condition under which the ECM 10 shifts the lead-acid battery 3 and the lithium-ion battery 4 from the discharge phase to the charge phase. For example, in order to prevent degradation of the lead-acid battery 3, when the discharge current of the lead-acid battery 3 has become equal to or greater than a predetermined maximum value, the ECM 10 drives the alternator 1 to charge the lead-acid battery 3 and the lithium-ion battery 4. It goes without saying that the shift to the charge phase based on establishment of such a condition has priority to the control of the first embodiment.

As described above, the power supply system 100 of the first embodiment is the power supply system 100 that includes the two secondary batteries having the different charge and discharge characteristics and is mountable on the vehicle, wherein the power supply system 100 is configured to include the lead-acid battery (lead-acid storage battery) 3 that is connected to the electrical load 50, the lithium-ion battery (lithium-ion storage battery) 4 that is connected in parallel with the lead-acid battery 3 with respect to the electrical load 50, the alternator (power generator) 1 that charges the lead-acid battery 3 and the lithium-ion battery 4, and the ECM (control unit) 10 that drives the alternator 1 based on the relationship between the discharge current of the lead-acid battery 3 and the discharge current of the lithium-ion battery 4 (e.g. the current ratio I1/I2 of these currents). Since it is configured that the timing to shift from the discharge phase to the charge phase is determined based on the current ratio of the discharge currents of the lead-acid battery 3 and the lithium-ion battery 4, i.e. not based on the SOC lower limit value of the lithium-ion battery 4 restricted by the lead-acid discharge 3 as in the conventional power supply system, it is possible to increase the usable SOC range of the lithium-ion battery 4 while suppressing an increase in discharge current from the lead-acid battery 3 or excessive discharge of the lead-acid battery 3. When the timing to shift to the charge phase is determined based on the SOC lower limit value of the lithium-ion battery 4 restricted by the lead-acid discharge 3, particularly when the lead-acid battery 3 is degraded, the charge and discharge are repeated in a short time. With the power supply system 100 of the first embodiment, when the lead-acid battery 3 is degraded, the SOC of the lithium-ion battery 4 can be used more efficiently, and therefore, the charge and discharge being repeated in a short time does not occur.

In the power supply system 100 of the first embodiment, as shown in FIG. 2, the ECM (control unit) 10 is configured to include the current value acquisition unit 11 that acquires the discharge current of the lead-acid battery (lead-acid storage battery) 3 and the discharge current of the lithium-ion battery (lithium-ion storage battery) 4, the current value comparison unit 12 that compares the discharge current of the lead-acid battery 3 and the discharge current of the lithium-ion battery 4 acquired by the current value acquisition unit 11, and the ALT control unit (power generator control unit) 14 that drives the alternator (power generator) 1 to charge the lead-acid battery and the lithium-ion battery based on the comparison result I1/I2 of the current value comparison unit 12. With the ECM 10 having such a configuration, the above-described effect of the power supply system 100 of the first embodiment can be exhibited.

In the power supply system 100 of the first embodiment, the current value comparison unit 12 is configured to calculate the current ratio I1/I2 between the discharge current of the lead-acid battery 3 and the discharge current of the lithium-ion battery 4, and the ALT control unit 14 is configured to drive the alternator 1 when the predetermined time has elapsed from when the current ratio I1/I2 has become equal to or less than the predetermined value (at the time of establishment of the first condition). With this configuration, even when the current ratio I1/I2 momentarily becomes equal to or less than the predetermined value, the shift from the discharge phase to the charge phase does not occur. Consequently, it is possible to increase the usable SOC range of the lithium-ion battery 4 while eliminating disturbance due to load fluctuation of the electrical load 50.

A method for controlling the power supply system 100 of the first embodiment is a method for controlling the power supply system 100 that includes the lead-acid battery (lead-acid storage battery) 3 connected to the electrical load 50, the lithium-ion battery (lithium-ion storage battery) 4 connected in parallel with the lead-acid battery 3 with respect to the electrical load 50, and the alternator (power generator) 1 configured to charge the lead-acid battery 3 and the lithium-ion battery 4 and is mountable on the vehicle, wherein the method is configured to include a step of detecting a discharge current of the lead-acid battery 3, a step of detecting a discharge current of the lithium-ion battery 4, and a step of driving the alternator 1 based on the relationship between the discharge current of the lead-acid battery 3 and the discharge current of the lithium-ion battery 4 (e.g. the current ratio I1/I2 of these currents). By configuring the control method for the power supply system 100 in this way, the above-described effect of the power supply system 100 can be exhibited.

Comparative Example

Hereinafter, in order to clarify the operation and effect of the power supply system 100 of the first embodiment, control of the conventional power supply system will be described using time charts of FIGS. 6(a)-7(d). FIGS. 6(a)-6(d) are time charts in the comparative example showing changes of physical quantities when the lead-acid battery and the lithium-ion battery shift from the discharge phase to the charge phase in the case where the lead-acid battery is new.

As shown in the time chart of FIG. 6(a) to FIG. 6(d), these physical quantities are approximately the same as those in the time chart of the power supply system 100 of the first embodiment shown in FIG. 3(a) to FIG. 3(d). Specifically, in the power supply system of this comparative example, as shown in FIG. 6(c), when the SOC of the lithium-ion battery has reached the SOC lower limit value restricted by the lead-acid battery, the alternator is driven so that the lead-acid battery and the lithium-ion battery shift from the discharge phase to the charge phase.

In this way, when the lead-acid battery is new or as good as new, as shown in FIG. 6(b), the discharge current of the lead-acid battery and the discharge current of the lithium-ion battery change in approximately the same state as in the first embodiment. In this case, the same effect is exhibited in the power supply system 100 of the first embodiment and the power supply system of the comparative example.

Next, a description will be given of the case where the lead-acid battery is degraded in the comparative example. FIGS. 7(a)-7(d) are time charts in the comparative example showing changes of physical quantities when the lead-acid battery and the lithium-ion battery shift from the discharge phase to the charge phase in the case where the lead-acid battery is degraded. FIG. 7(a) to FIG. 7(d) respectively correspond to FIG. 6(a) to FIG. 6(d).

In the power supply system of the comparative example, as shown in FIG. 7(c), like in the case where the lead-acid battery is new or as good as new, when the SOC of the lithium-ion battery has reached the SOC lower limit value restricted by the lead-acid battery, the alternator is driven so that the lead-acid battery and the lithium-ion battery shift from the discharge phase to the charge phase.

As also described above in the operation of the power supply system 100 of the first embodiment, when the lead-acid battery is degraded, it is not possible to output sufficient discharge current from the lead-acid battery. Therefore, when the demand of the electrical load is large, the lithium-ion battery outputs discharge current more than when the lead-acid battery is new or as good as new. In this case, compared to the case where the lead-acid battery is new or as good as new, the SOC of the lithium-ion battery decreases faster so that the time until the SOC of the lithium-ion battery reaches the SOC lower limit value restricted by the lead-acid battery is shortened. In this way, by controlling the phase to shift from the discharge phase to the charge phase at the SOC lower limit value restricted by the lead-acid battery, the alternator is turned on/off repeatedly.

In the conventional charge/discharge switching control, it is not possible to increase the discharge current of the degraded lead-acid battery, and therefore, as shown in FIG. 7(b), according to the demand of the electrical load of the power supply system, the lithium-ion battery continues to output discharge current more than when the lead-acid battery is new or as good as new. Therefore, differently from the control in the charge/discharge switching process by the power supply system 100 of the first embodiment, the ratio of the discharge currents, i.e. (discharge current of lithium-ion battery)/(discharge current of lead-acid battery), does not decrease to the predetermined value.

In this way, in the conventional charge/discharge switching control, when the lead-acid battery is new or as good as new, the SOC (i.e. the discharge current amount) of the lithium-ion battery can be used effectively to some extent. However, when the lead-acid battery is degraded, since the discharge current of the lead-acid battery decreases, even when the SOC of the lithium-ion battery can still be used, the lead-acid battery and the lithium-ion battery shift from the discharge phase to the charge phase.

When the lead-acid battery is new or as good as new, the internal resistance of the lead-acid battery is low in terms of its physical properties, so that the lead-acid battery can receive relatively high charge current in the charge phase. However, after degradation of the lead-acid battery, it is not possible to receive such high current. Further, the lead-acid battery tends to be degraded early by repetition of charge and discharge with high current. Therefore, in the power supply system 100 of the first embodiment, by effectively using the use range (control range) of the SOC of the lithium-ion battery particularly when the lead-acid battery is degraded, it is possible to suppress repetition of charge and discharge of the lead-acid battery and the lithium-ion battery.

Second Embodiment

Hereinafter, the second embodiment of the present invention will be described mainly with respect to points of difference from the first embodiment. In the second embodiment, the same symbols will be assigned to portions that perform the same functions as those of the first embodiment, thereby omitting a duplicate description as appropriate. Since the functional configuration of a power supply system of the second embodiment is the same as that of the first embodiment, it will be described using the functional block diagram of FIG. 2 as appropriate.

In the first embodiment described above, the power supply system 100 performs control so that the lead-acid battery 3 and the lithium-ion battery 4 are switched from the discharge phase to the charge phase when the ratio (current ratio) between the discharge current of the lithium-ion battery 4 and the discharge current of the lead-acid battery 3 has become equal to or less than the predetermined value and that state has lasted for the predetermined time (when the first condition is established). The second embodiment differs from the first embodiment in that the lead-acid battery 3 and the lithium-ion battery 4 are switched from the discharge phase to the charge phase when the discharge current of the lithium-ion battery 4 has exceeded a predetermined threshold value after the first condition applied to the first embodiment is satisfied.

Figure 8:
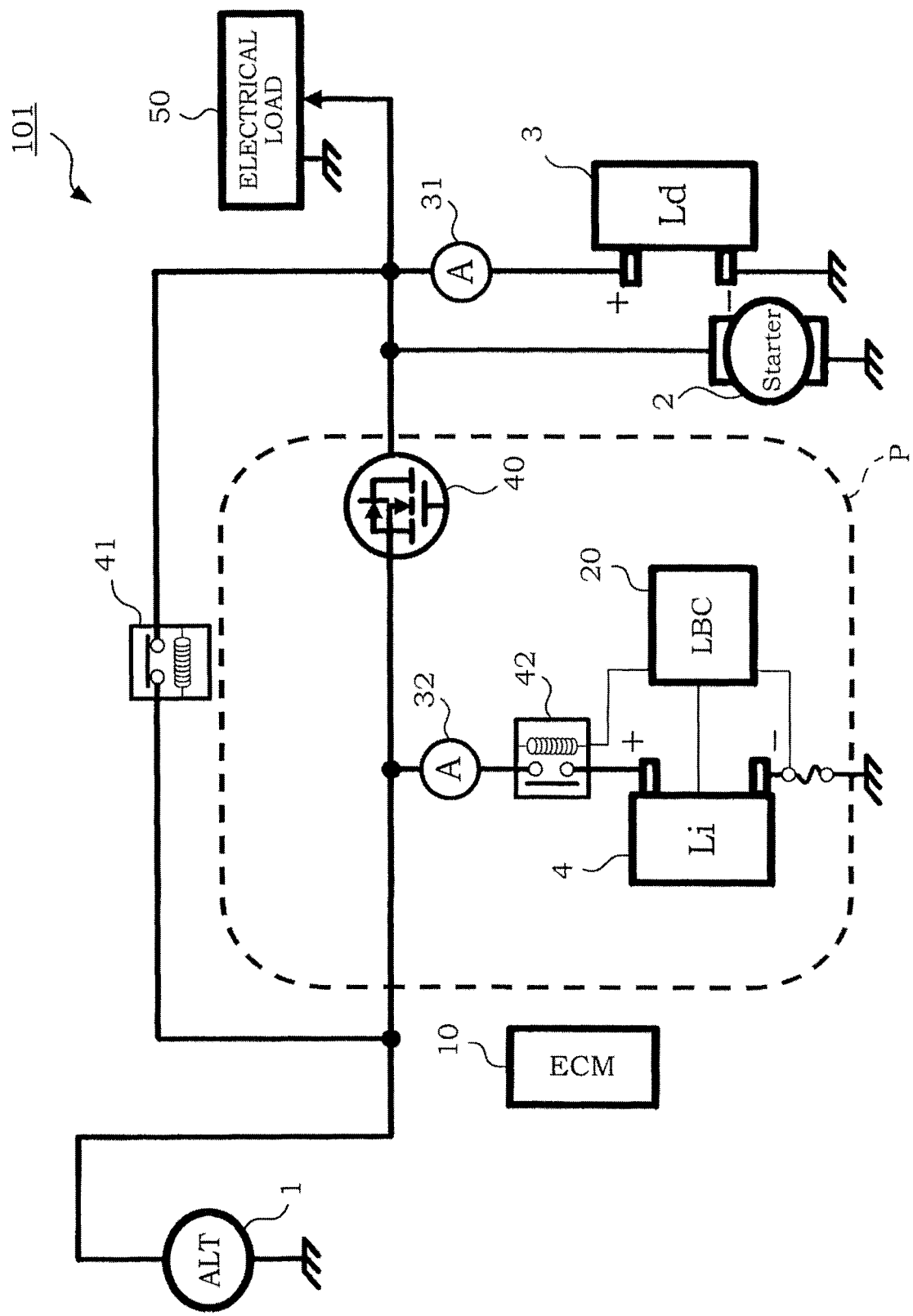
FIG. 8 is a block diagram showing the overall configuration of a power supply system in a second embodiment of the present invention.

FIG. 8 is a block diagram showing the overall configuration of a power supply system 101 in the second embodiment of the present invention. The power supply system 101 of the second embodiment differs from the power supply system 100 of the first embodiment in that the starter 2 is connected to the lead-acid battery 3 side with respect to the lead-acid battery path relay 41. Therefore, when starting the vehicle or returning from idling stop, controls differ in the power supply system 100 of the first embodiment and the power supply system 101 of the second embodiment. However, in the charge/discharge switching control according to one or more embodiments of the present invention, since the lead-acid battery 3 and the lithium-ion battery 4 are connected in parallel to the alternator 1 in either of the power supply systems 100, 101, the switching operations are the same with respect to the lead-acid battery path relay 41 and the lithium-ion battery accessory relay 42.

Like the power supply system 100 of the first embodiment, the power supply system 101 of the second embodiment includes, as shown in FIG. 8, the alternator 1, the starter 2, the lithium-ion battery 4, the MOSFET 40, the electrical load 50, the ECM 10, the LBC 20, the two current sensors 31, 32, the lead-acid battery path relay 41, and the lithium-ion battery accessory relay 42.

Figure 9:
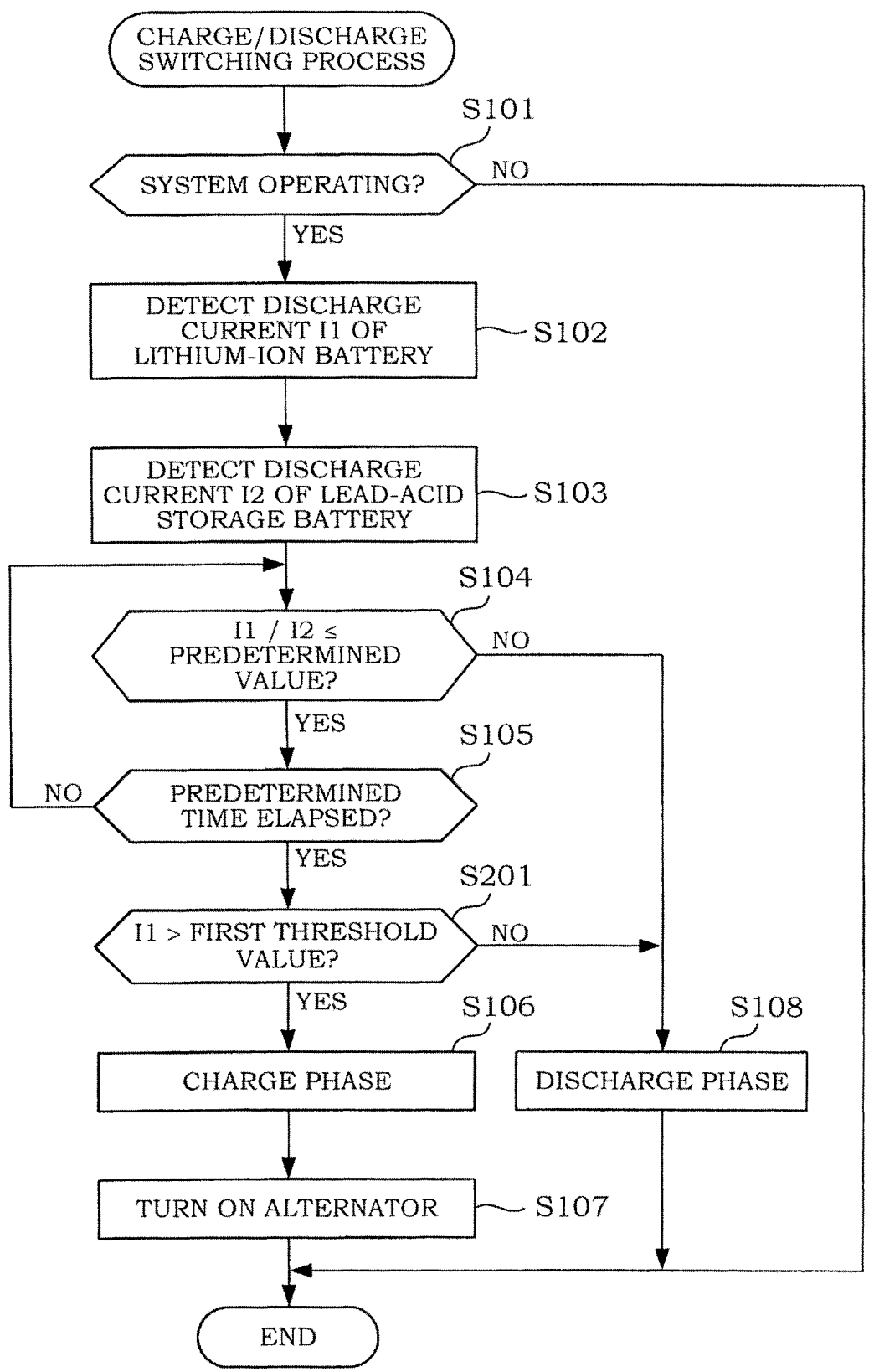
FIG. 9 is a flowchart showing one example of a charge/discharge switching process that is executed by an ECM of the power supply system of the second embodiment.

Next, the operation of the power supply system 101 of the second embodiment will be described. FIG. 9 is a flowchart showing one example of a charge/discharge switching process that is executed by the ECM 10 of the power supply system 101 of the second embodiment. The same step numbers will be assigned to the same steps as those of the charge/discharge switching process of the first embodiment, and the same processing will be briefly described. The charge/discharge switching process is executed at a predetermined time interval (e.g. every 10 milliseconds) while the vehicle equipped with the power supply system 101 is operating.

In the charge/discharge switching process, the ECM 10 first determines whether or not the power supply system 101 is operating (step S101). When the ECM 10 has determined that the power supply system 101 is not operating, the ECM 10 ends the charge/discharge switching process as it is.

On the other hand, when the ECM 10 has determined that the power supply system 101 is operating, the ECM 10 detects a discharge current I1 of the lithium-ion battery 4 using the current sensor 32 (step S102) and detects a discharge current I2 of the lead-acid battery 3 using the current sensor 31 (step S103). Then, the current value acquisition unit 11 acquires the discharge currents I1, I2.

Then, the current value comparison unit 12 of the ECM 10 calculates a current ratio I1/I2 as the ratio of the discharge currents and outputs the calculation result to the ALT control unit 14. The ALT control unit 14 determines whether or not the current ratio I1/I2 acquired from the current value comparison unit 12 is equal to or less than the predetermined value (step S104). When the ALT control unit 14 has determined that the current ratio I1/I2 is greater than the predetermined value, the ALT control unit 14 determines that the phase should still be the discharge phase (step S108), and ends the charge/discharge switching process as it is.

On the other hand, when the ALT control unit 14 has determined that the current ratio I1/I2 is equal to or less than the predetermined value, the ALT control unit 14, using the timer 13, measures an elapsed time from when the current ratio I1/I2 has become equal to or less than the predetermined value. Then, the ALT control unit 14 determines whether or not the elapsed time has reached the predetermined time (step S105). When the ALT control unit 14 has determined that the elapsed time has not reached the predetermined time, the ALT control unit 14 repeats determinations at steps S104 and S105.

When the ALT control unit 14 has determined that the predetermined time has elapsed from when the current ratio I1/I2 has become equal to or less than the predetermined value, the ALT control unit 14 then determines whether or not the discharge current I1 of the lithium-ion battery 4 is greater than a first threshold value (step S201). When the ALT control unit 14 has determined that the discharge current I1 is greater than the first threshold value, the ALT control unit 14 determines that the phase should be shifted to the charge phase (step S106), drives (turns on) the alternator 1 (step S107), and ends the charge/discharge switching process.

On the other hand, when the ALT control unit 14 has determined that the discharge current I1 is equal to or less than the first threshold value, since the discharge current of the lithium-ion battery 4 can still be used, the ALT control unit 14 determines that the phase should still be the discharge phase (step S108), and ends the charge/discharge switching process as it is.

Figure 10:
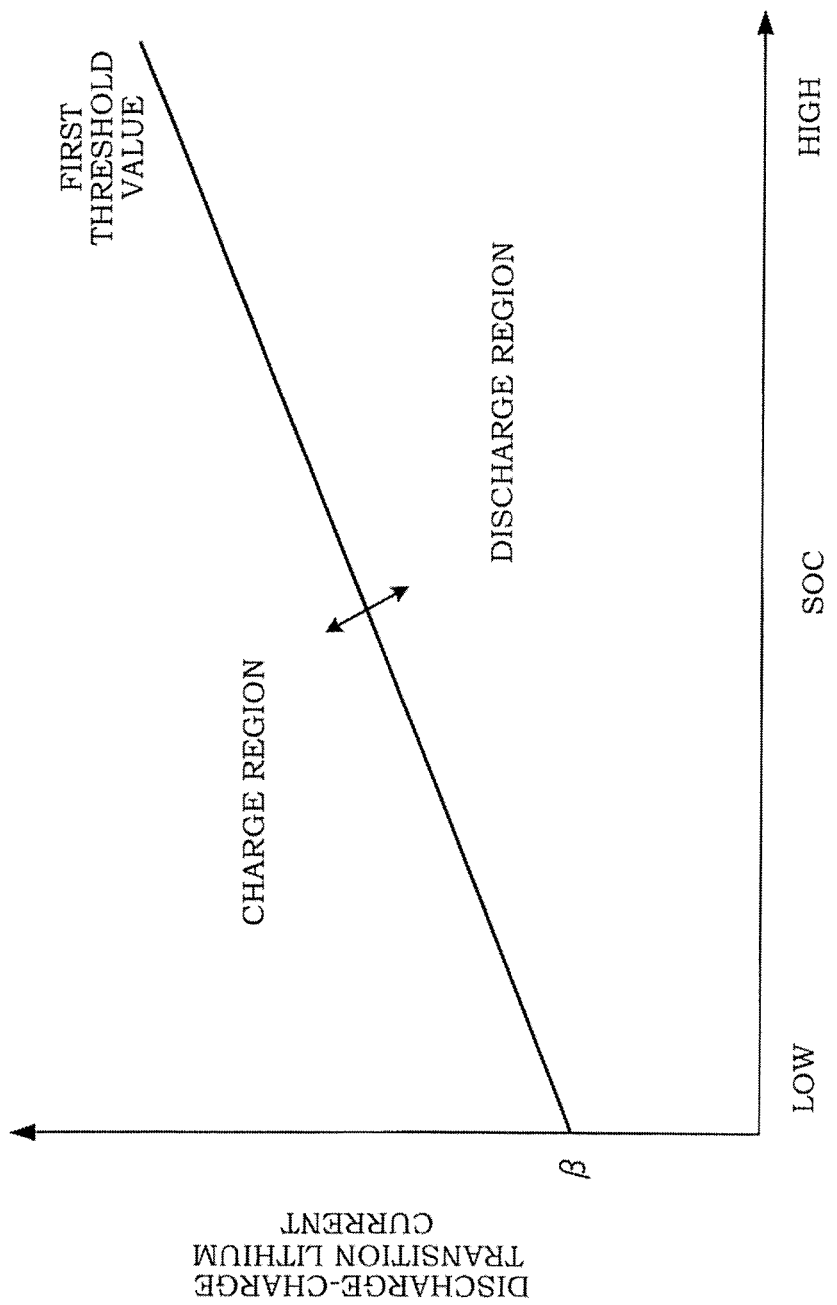
FIG. 10 is a graph showing charge/discharge switching timing of a lithium-ion battery in this embodiment.

Herein, the first threshold value for determining the charge/discharge switching timing of the lead-acid battery 3 and the lithium-ion battery 4 will be described. FIG. 10 is a graph showing the charge/discharge switching timing of the lithium-ion battery 4 in the second embodiment. In the second embodiment, in the charge/discharge switching process shown in FIG. 9, when the current ratio I1/I2 has become equal to or less than the predetermined value ("Yes" at step S104), then the predetermined time has elapsed ("Yes" at step S105), and then the discharge current of the lithium-ion battery 4 has become greater than the first threshold value ("Yes" at step S201), the lead-acid battery 3 and the lithium-ion battery 4 are shifted from the discharge phase to the charge phase (step S106).

In the second embodiment, the first threshold value is determined using a linear function given by the following formula (3).

$$\text{(first threshold value)} = \alpha \times (\text{SOC of lithium-ion battery}) + \beta \quad (3)$$

Herein, the constant $\alpha$ is a positive value and represents the slope of a discharge-charge transition straight line. The constant $\beta$ is a virtual current value when the SOC of the lithium-ion battery 4 is zero. The constants $\alpha$, $\beta$ may be determined by simulations, experiments, or the like based on the system configuration.

In the second embodiment, when the ALT control unit 14 has determined that the predetermined time has elapsed from when the current ratio I1/I2 has become equal to or less than the predetermined value, the ALT control unit 14 shifts the lead-acid battery 3 and the lithium-ion battery 4 from the discharge phase to the charge phase only when the ALT control unit 14 has determined that a transition has been made from a discharge region to a charge region across such a discharge-charge transition straight line.

The reason for switching charge and discharge when the discharge current of the lithium-ion battery 4 has exceeded the straight line with a slope, i.e. not a constant value, is that as the SOC of the lithium-ion battery 4 increases, it is possible to cope with higher discharge current.

As described above, the power supply system 101 of the second embodiment is configured such that when the predetermined time has elapsed from when the current ratio I1/I2 between the discharge current of the lead-acid battery 3 and the discharge current of the lithium-ion battery 4 has become equal to or less than the predetermined value (first condition), the ALT control unit (power generator control unit) 14 drives the alternator 1 when the discharge current of the lithium-ion battery 4 is greater than the first threshold value. Consequently, it is possible to increase the usable SOC range of the lithium-ion battery 4 while suppressing an increase in discharge current from the lead-acid battery 3 or excessive discharge of the lead-acid battery 3.

As the first threshold value, use may be made of the straight line of the linear function between the SOC and the discharge current of the lithium-ion battery 4 given by the above-described formula (3). By configuring the control of transition of the lead-acid battery 3 and the lithium-ion battery 4 from the discharge phase to the charge phase in this way, when the SOC of the lithium-ion battery 4 is high, it is possible to allow the output of relatively high discharge current. By gradually lowering the discharge current of the lithium-ion battery 4, serving as transition timing, according to a decrease in the SOC of the lithium-ion battery 4, it is possible to use the SOC of the lithium-ion battery 4 more effectively.

The hardware configuration of the power supply system 101 of the second embodiment shows one example of the arrangement of the respective devices and can be applied to the control method of the first embodiment. The hardware configuration of the power supply system 100 of the first embodiment can also be applied to the control method for the power supply system 101 of this embodiment.

Third Embodiment

Hereinafter, the third embodiment of the present invention will be described mainly with respect to points of difference from the first embodiment. In the third embodiment, the same symbols will be assigned to portions that perform the same functions as those of the first embodiment, thereby omitting a duplicate description as appropriate. Since the functional configuration of a power supply system of the third embodiment is the same as that of the first embodiment, it will be described using the functional block diagram of FIG. 2 as appropriate.

In the first embodiment described above, the power supply system 100 performs control so that the lead-acid battery 3 and the lithium-ion battery 4 are switched from the discharge phase to the charge phase when the ratio (current ratio) between the discharge current of the lithium-ion battery 4 and the discharge current of the lead-acid battery 3 has become equal to or less than the predetermined value and that state has lasted for the predetermined time (when the first condition is established). The third embodiment differs from the first embodiment in that even when the first condition applied to the first embodiment is not satisfied, the lead-acid battery 3 and the lithium-ion battery 4 are switched from the discharge phase to the charge phase when the discharge current of the lead-acid battery 3 has exceeded a predetermined threshold value.

Figure 11:
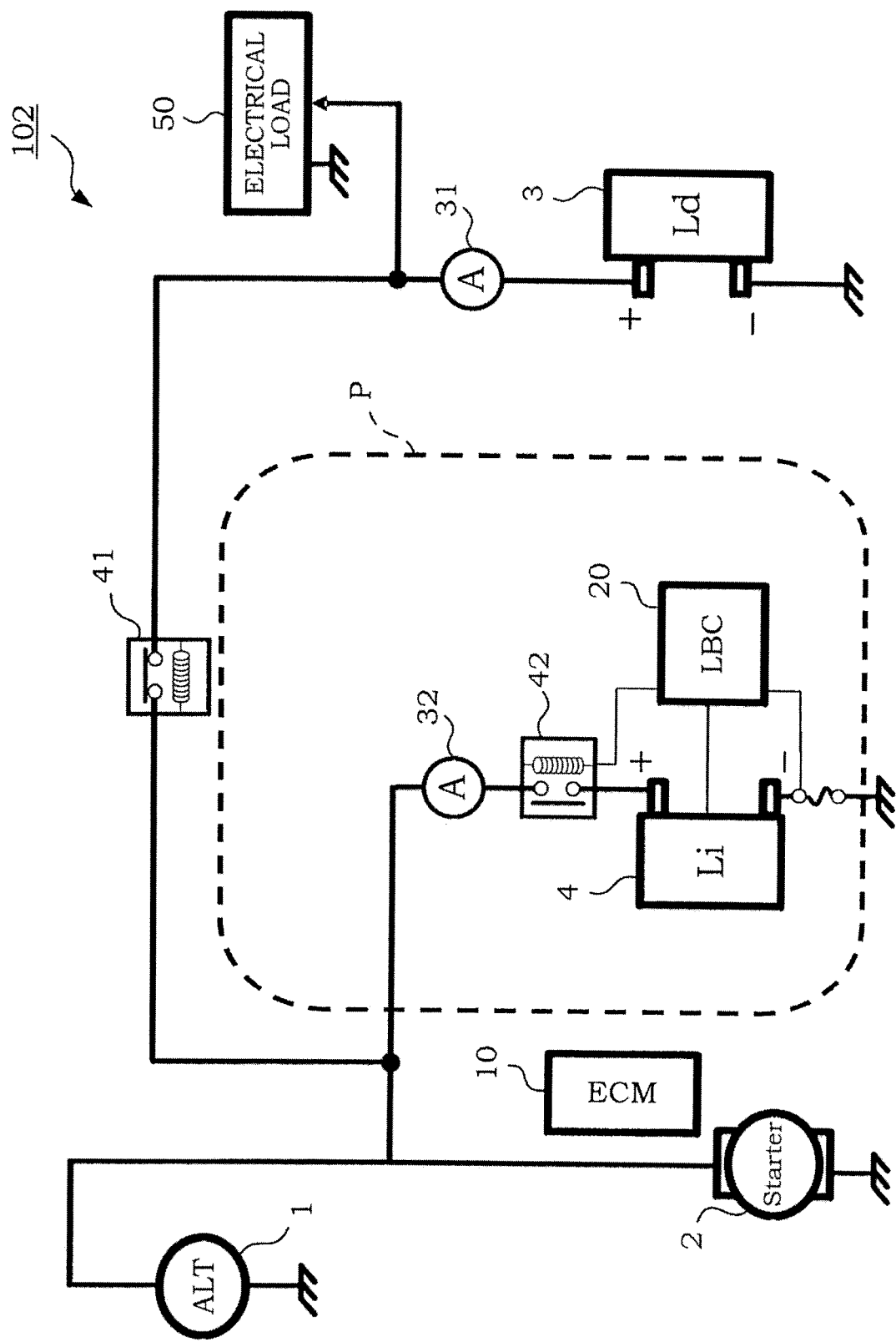
FIG. 11 is a block diagram showing the overall configuration of a power supply system in a third embodiment of the present invention.

FIG. 11 is a block diagram showing the overall configuration of a power supply system 102 in the third embodiment of the present invention. The power supply system 102 of the third embodiment differs from the power supply system 100 of the first embodiment in that the first path from the lithium-ion battery 4 to the lead-acid battery 3 is removed and in that the MOSFET 40 provided on the first path is removed. In such a configuration, when the alternator 1 is driven, the charge current is supplied to the lead-acid battery 3 via the lead-acid battery path relay 41.

Except for the MOSFET 40, like the power supply system 100 of the first embodiment, the power supply system 102 of the third embodiment includes, as shown in FIG. 11, the alternator 1, the starter 2, the lithium-ion battery 4, the electrical load 50, the ECM 10, the LBC 20, the two current sensors 31, 32, the lead-acid battery path relay 41, and the lithium-ion battery accessory relay 42.

Figure 12:
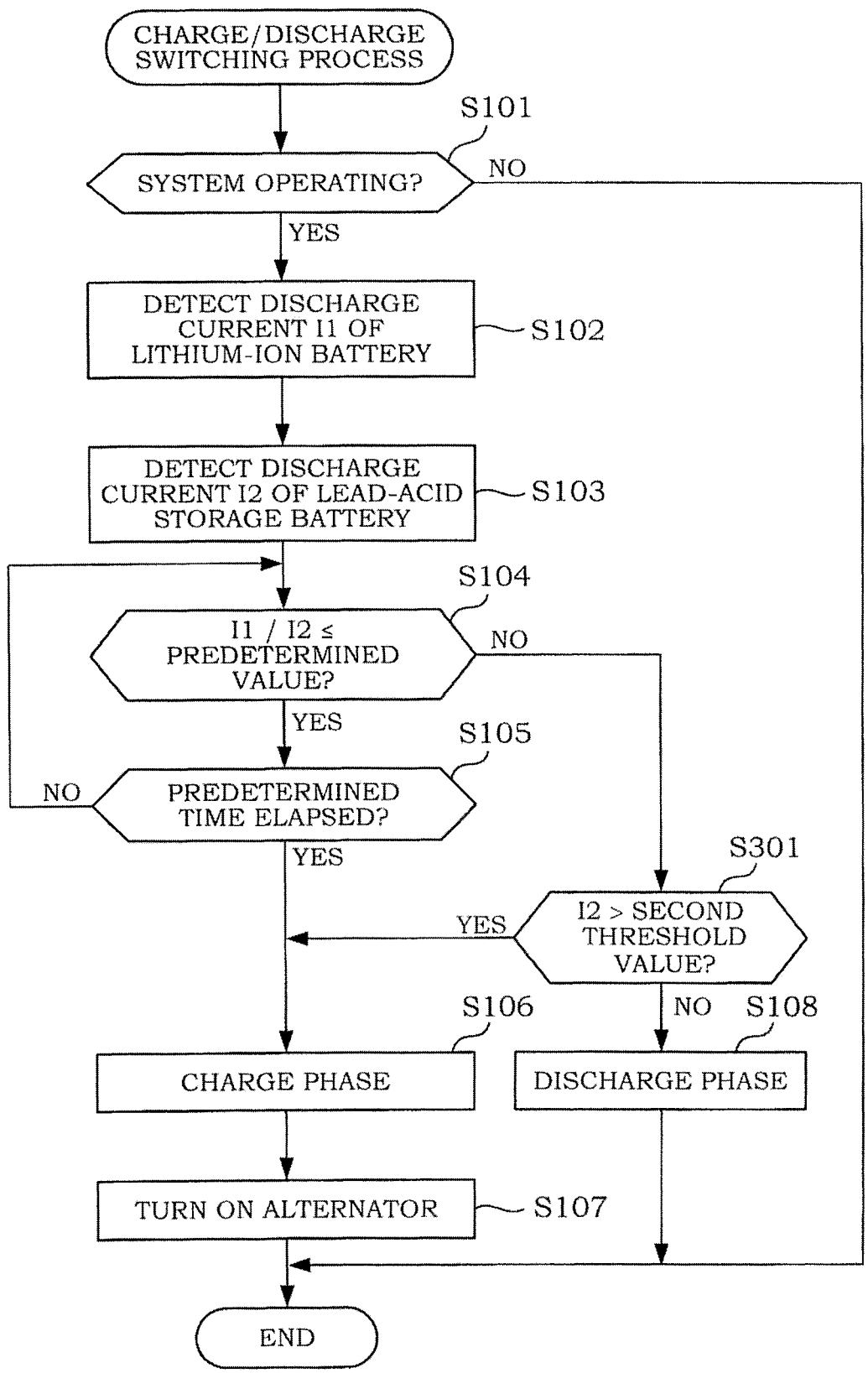
FIG. 12 is a flowchart showing one example of a charge/discharge switching process that is executed by an ECM of the power supply system of the third embodiment.

Next, the operation of the power supply system 102 of the third embodiment will be described. FIG. 12 is a flowchart showing one example of a charge/discharge switching process that is executed by the ECM 10 of the power supply system 102 of the third embodiment. The same step numbers will be assigned to the same steps as those of the charge/discharge switching process of the first embodiment, and the same processing will be briefly described. The charge/discharge switching process is executed at a predetermined time interval (e.g. every 10 milliseconds) while the vehicle equipped with the power supply system 102 is operating.

In the charge/discharge switching process, the ECM 10 first determines whether or not the power supply system 102 is operating (step S101). When the ECM 10 has determined that the power supply system 102 is not operating, the ECM 10 ends the charge/discharge switching process as it is.

On the other hand, when the ECM 10 has determined that the power supply system 102 is operating, the ECM 10 detects a discharge current I1 of the lithium-ion battery 4 using the current sensor 32 (step S102) and detects a discharge current I2 of the lead-acid battery 3 using the current sensor 31 (step S103). Then, the current value acquisition unit 11 acquires the discharge currents I1, I2.

Then, the current value comparison unit 12 of the ECM 10 calculates a current ratio I1/I2 as the ratio of the discharge currents and outputs the calculation result to the ALT control unit 14. The ALT control unit 14 determines whether or not the current ratio I1/I2 acquired from the current value comparison unit 12 is equal to or less than the predetermined value (step S104). When the ALT control unit 14 has determined that the current ratio I1/I2 is equal to or less than the predetermined value, the ALT control unit 14, using the timer 13, measures an elapsed time from when the current ratio I1/I2 has become equal to or less than the predetermined value. Then, the ALT control unit 14 determines whether or not the elapsed time has reached the predetermined time (step S105). When the ALT control unit 14 has determined that the elapsed time has not reached the predetermined time, the ALT control unit 14 repeats determinations at steps S104 and S105.

When the ALT control unit 14 has determined at step S105 that the predetermined time has elapsed from when the current ratio I1/I2 has become equal to or less than the predetermined value, the ALT control unit 14 determines that the phase should be shifted to the charge phase (step S106), drives (turns on) the alternator 1 (step S107), and ends the charge/discharge switching process.

On the other hand, when the ALT control unit 14 has determined at step S104 that the current ratio I1/I2 is greater than the predetermined value, the ALT control unit 14 then determines whether or not the discharge current I2 of the lead-acid battery 3 is greater than a second threshold value (step S301).

When the ALT control unit 14 has determined that the discharge current I2 of the lead-acid battery 3 is greater than the second threshold value, the ALT control unit 14 determines that the phase should be shifted to the charge phase (step S106), drives (turns on) the alternator 1 (step S107), and ends the charge/discharge switching process.

On the other hand, when the ALT control unit 14 has determined that the discharge current I2 of the lead-acid battery 3 is equal to or less than the second threshold value, the ALT control unit 14 determines that the phase should still be the discharge phase (step S108), and ends the charge/discharge switching process as it is.

Figure 13:
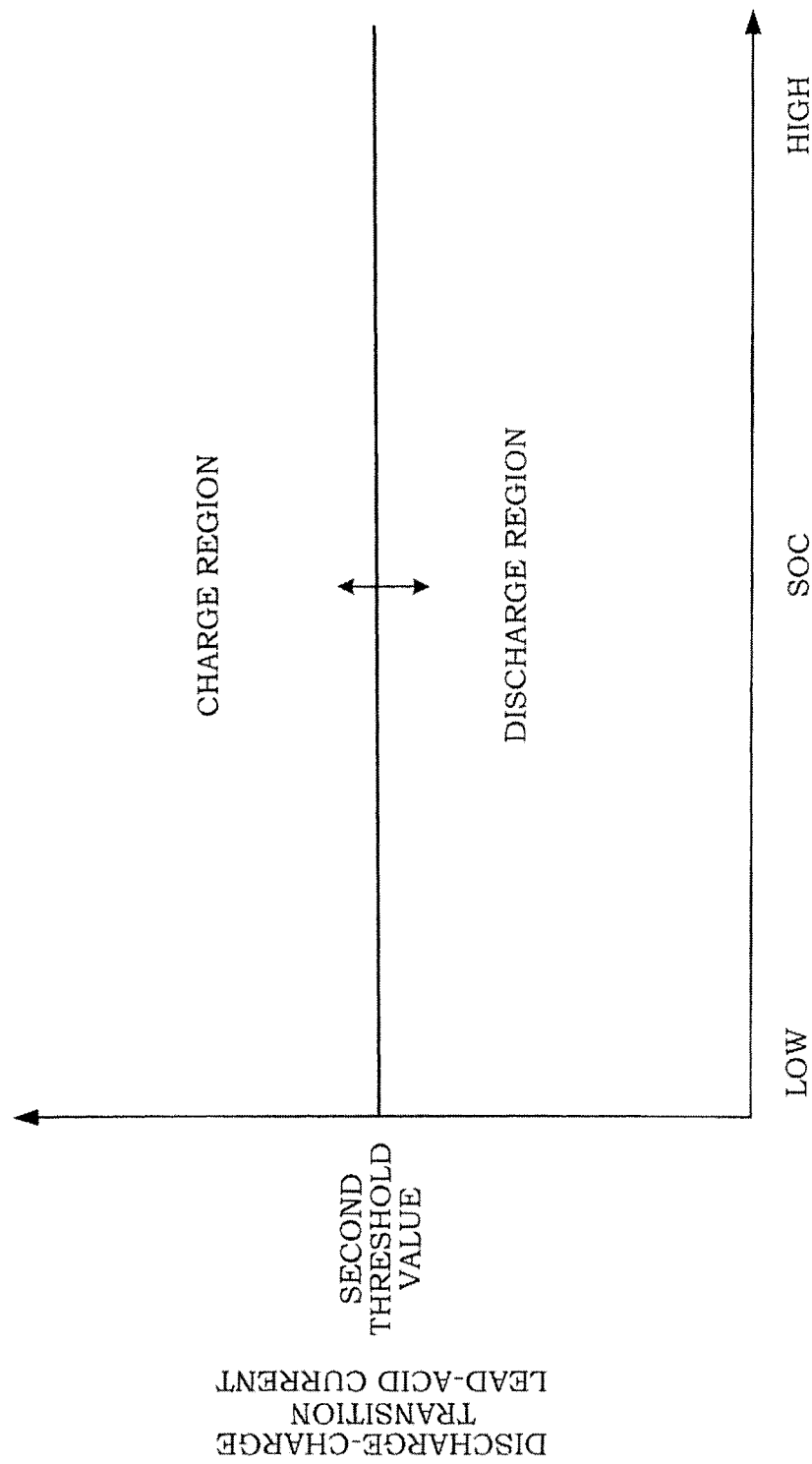
FIG. 13 is a graph showing charge/discharge switching timing of a lead-acid battery in the third embodiment.

Herein, the second threshold value for determining the charge/discharge switching timing of the lead-acid battery 3 and the lithium-ion battery 4 will be described. FIG. 13 is a graph showing the charge/discharge switching timing of the lead-acid battery 3 in the third embodiment. In the third embodiment, in the charge/discharge switching process shown in FIG. 12, even when the current ratio I1/I2 is greater than the predetermined value ("No" at step S104), the lead-acid battery 3 and the lithium-ion battery 4 are shifted from the discharge phase to the charge phase (step S106) when the discharge current I2 of the lead-acid battery 3 is determined to be greater than the second threshold value ("Yes" at step S301).

The second threshold value is determined based on the maximum allowable discharge current of the lead-acid battery 3, and what percentage of the maximum allowable discharge current the second threshold value should be set to may be determined by simulations, experiments, or the like. As shown in FIG. 13, the second threshold value may be a constant value regardless of the SOC of the lead-acid battery 3.

As described above, the power supply system 102 of the third embodiment is configured such that even when the current ratio I1/I2 between the discharge current of the lead-acid battery 3 and the discharge current of the lithium-ion battery 4 is greater than the predetermined value, the ALT control unit 14 (power generator control unit) drives the alternator 1 (power generator) when the discharge current of the lead-acid battery 3 is greater than the second threshold value. Consequently, it is possible to increase the usable SOC range of the lithium-ion battery 4 while suppressing an increase in discharge current from the lead-acid battery 3 or excessive discharge of the lead-acid battery 3. In particular, by setting the upper limit value of the discharge current of the lead-acid battery 3, it is possible to effectively prevent degradation of the lead-acid battery 3 due to excessive discharge.

The hardware configuration of the power supply system 102 of the third embodiment shows one example of the arrangement of the respective devices and can be applied to the control methods of the first embodiment and the second embodiment. The hardware configuration of the power supply system 100 of the first embodiment and the hardware configuration of the power supply system 101 of the second embodiment can also be applied to the control method for the power supply system 102 of the third embodiment.

Fourth Embodiment

Hereinafter, the fourth embodiment of the present invention will be described mainly with respect to points of difference from the first and third embodiments. In the fourth embodiment, the same symbols will be assigned to portions that perform the same functions as those of the third embodiment, thereby omitting a duplicate description as appropriate. Since the functional configuration of a power supply system of the fourth embodiment is the same as that of the first embodiment, it will be described using the functional block diagram of FIG. 2 as appropriate.

In the first embodiment described above, the power supply system 100 performs control so that the lead-acid battery 3 and the lithium-ion battery 4 are switched from the discharge phase to the charge phase when the ratio (current ratio) between the discharge current of the lithium-ion battery 4 and the discharge current of the lead-acid battery 3 has become equal to or less than the predetermined value and that state has lasted for the predetermined time (when the first condition is established). In the third embodiment, even when the first condition applied to the first embodiment is not satisfied, the lead-acid battery 3 and the lithium-ion battery 4 are controlled to switch from the discharge phase to the charge phase when the discharge current of the lead-acid battery 3 has exceeded the predetermined threshold value. The fourth embodiment differs from the first and third embodiments in that even when the first condition applied to the first embodiment is not satisfied, the lead-acid battery 3 and the lithium-ion battery 4 are controlled to switch from the discharge phase to the charge phase when the discharge current of the lithium-ion battery 4 has exceeded a predetermined threshold value.

Figure 14:
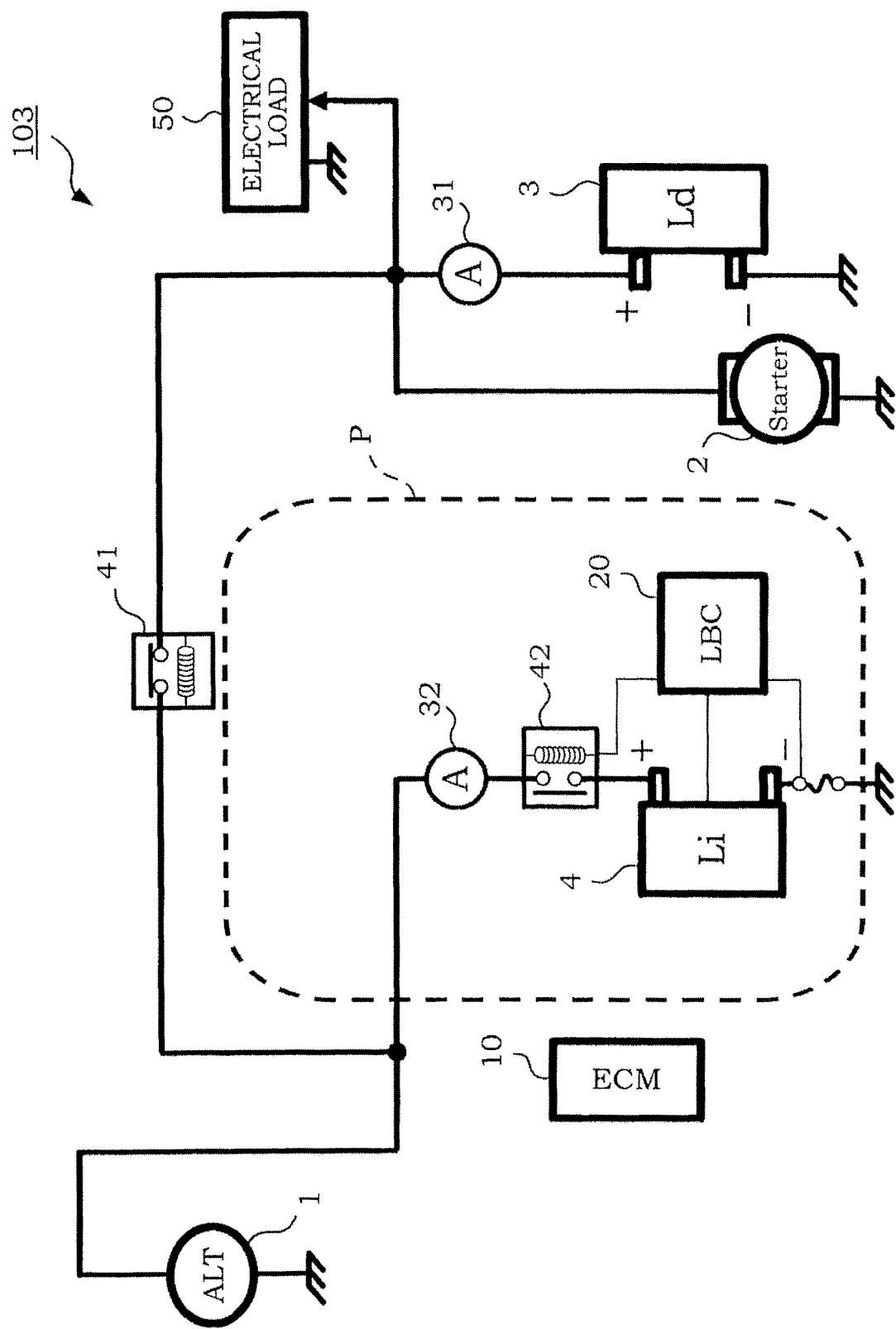
FIG. 14 is a block diagram showing the overall configuration of a power supply system in a fourth embodiment of the present invention.

FIG. 14 is a block diagram showing the overall configuration of a power supply system 103 in the fourth embodiment of the present invention. The power supply system 103 of the fourth embodiment differs from the power supply system 102 of the third embodiment in that the starter 2 is connected to the lead-acid battery 3 side with respect to the lead-acid battery path relay 41. When starting the vehicle or returning from idling stop, controls differ in the power supply system 102 of the third embodiment and the power supply system 103 of the fourth embodiment. However, in the charge/discharge switching control according to one or more embodiments of the present invention, since the lead-acid battery 3 and the lithium-ion battery 4 are connected in parallel to the alternator 1 in either of the power supply systems 102, 103, the switching operations are the same with respect to the lead-acid battery path relay 41 and the lithium-ion battery accessory relay 42.

Like the power supply system 102 of the third embodiment, the power supply system 103 of the fourth embodiment includes, as shown in FIG. 14, the alternator 1, the starter 2, the lithium-ion battery 4, the electrical load 50, the ECM 10, the LBC 20, the two current sensors 31, 32, the lead-acid battery path relay 41, and the lithium-ion battery accessory relay 42.

Figure 15:
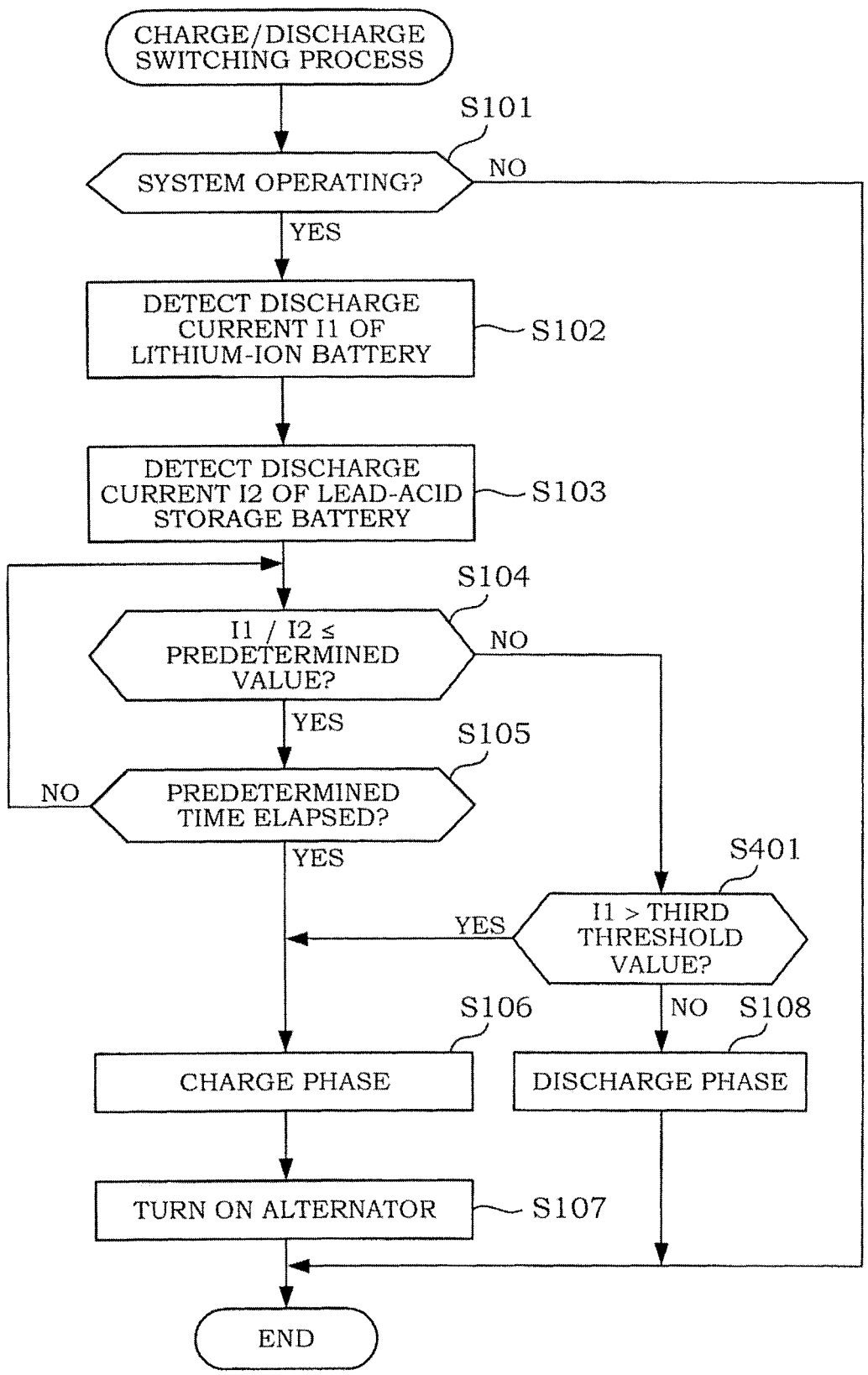
FIG. 15 is a flowchart showing one example of a charge/discharge switching process that is executed by an ECM of the power supply system of the fourth embodiment.

Next, the operation of the power supply system 103 of the fourth embodiment will be described. FIG. 15 is a flowchart showing one example of a charge/discharge switching process that is executed by the ECM 10 of the power supply system 103 of the fourth embodiment. The same step numbers will be assigned to the same steps as those of the charge/discharge switching process of the first embodiment, and the same processing will be briefly described. The charge/discharge switching process is executed at a predetermined time interval (e.g. every 10 milliseconds) while the vehicle equipped with the power supply system 103 is operating.

In the charge/discharge switching process, the ECM 10 first determines whether or not the power supply system 103 is operating (step S101). When the ECM 10 has determined that the power supply system 103 is not operating, the ECM 10 ends the charge/discharge switching process as it is.

On the other hand, when the ECM 10 has determined that the power supply system 103 is operating, the ECM 10 detects a discharge current I1 of the lithium-ion battery 4 using the current sensor 32 (step S102) and detects a discharge current I2 of the lead-acid battery 3 using the current sensor 31 (step S103). Then, the current value acquisition unit 11 acquires the discharge currents I1, I2.

Then, the current value comparison unit 12 of the ECM 10 calculates a current ratio I1/I2 as the ratio of the discharge currents and outputs the calculation result to the ALT control unit 14. The ALT control unit 14 determines whether or not the current ratio I1/I2 acquired from the current value comparison unit 12 is equal to or less than the predetermined value (step S104). When the ALT control unit 14 has determined that the current ratio I1/I2 is equal to or less than the predetermined value, the ALT control unit 14, using the timer 13, measures an elapsed time from when the current ratio I1/I2 has become equal to or less than the predetermined value. Then, the ALT control unit 14 determines whether or not the elapsed time has reached the predetermined time (step S105). When the ALT control unit 14 has determined that the elapsed time has not reached the predetermined time, the ALT control unit 14 repeats determinations at steps S104 and S105.

When the ALT control unit 14 has determined at step S105 that the predetermined time has elapsed from when the current ratio I1/I2 has become equal to or less than the predetermined value, the ALT control unit 14 determines that the phase should be shifted to the charge phase (step S106), drives (turns on) the alternator 1 (step S107), and ends the charge/discharge switching process.

On the other hand, when the ALT control unit 14 has determined at step S104 that the current ratio I1/I2 is greater than the predetermined value, the ALT control unit 14 then determines whether or not the discharge current I1 of the lithium-ion battery 4 is greater than a third threshold value (step S401).

When the ALT control unit 14 has determined that the discharge current I1 of the lithium-ion battery 4 is greater than the third threshold value, the ALT control unit 14 determines that the phase should be shifted to the charge phase (step S106), drives (turns on) the alternator 1 (step S107), and ends the charge/discharge switching process.

On the other hand, when the ALT control unit 14 has determined that the discharge current I1 of the lithium-ion battery 4 is equal to or less than the third threshold value, the ALT control unit 14 determines that the phase should still be the discharge phase (step S108), and ends the charge/discharge switching process as it is.

Figure 16:
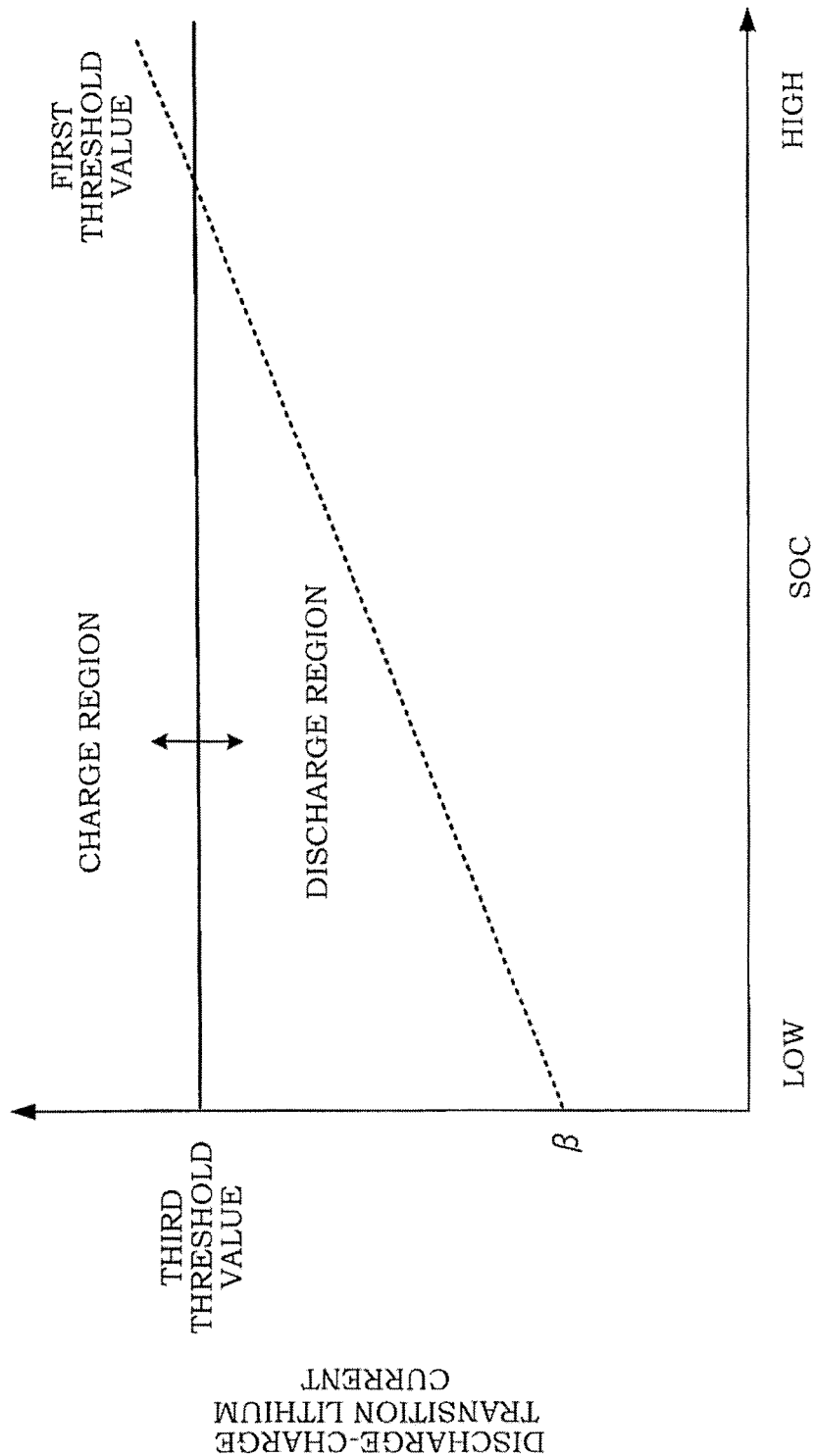
FIG. 16 is a graph showing charge/discharge switching timing of a lithium-ion battery in the fourth embodiment.

Herein, the third threshold value for determining the charge/discharge switching timing of the lead-acid battery 3 and the lithium-ion battery 4 will be described. FIG. 16 is a graph showing the charge/discharge switching timing of the lithium-ion battery 4 in the fourth embodiment. In the fourth embodiment, in the charge/discharge switching process shown in FIG. 15, even when the current ratio I1/I2 is greater than the predetermined value ("No" at step S104), the lead-acid battery 3 and the lithium-ion battery 4 are shifted from the discharge phase to the charge phase (step S106) when the discharge current I1 of the lithium-ion battery 4 is determined to be greater than the third threshold value ("Yes" at step S401).

The third threshold value is determined based on the maximum allowable discharge current and so on of the lithium-ion battery 4, and what percentage of the maximum allowable discharge current the third threshold value should be set to may be determined by simulations, experiments, or the like. As shown in FIG. 16, the third threshold value may be a constant value regardless of the SOC of the lithium-ion battery 4.

In FIG. 16, the transition straight line of the first threshold value in the graph of FIG. 10 used in describing the second embodiment is indicated by a dotted line. In the example of FIG. 16, the first threshold value is greater than the third threshold value at a portion where the SOC of the lithium-ion battery 4 is high. However, the first threshold value and the third threshold value may be set to the same value when the SOC of the lithium-ion battery 4 is 100%.

As described above, the power supply system 103 of the fourth embodiment is configured such that even when the current ratio I1/I2 between the discharge current of the lead-acid battery 3 and the discharge current of the lithium-ion battery 4 is greater than the predetermined value, the ALT control unit 14 (power generator control unit) drives the alternator 1 (power generator) when the discharge current of the lithium-ion battery 4 is greater than the third threshold value that is greater than the first threshold value of the second embodiment. Consequently, it is possible to increase the usable SOC range of the lithium-ion battery 4 while suppressing an increase in discharge current from the lead-acid battery 3 and excessive discharge of the lithium-ion battery 4. In particular, by setting the upper limit value of the discharge current of the lithium-ion battery 4, it is possible to effectively prevent degradation of the lithium-ion battery 4 due to excessive discharge.

The hardware configuration of the power supply system 103 of the fourth embodiment shows one example of the arrangement of the respective devices and can be applied to the control method of any of the first to third embodiments. The hardware configuration of the power supply system 100 of the first embodiment, the hardware configuration of the power supply system 101 of the second embodiment, and the hardware configuration of the power supply system 102 of the third embodiment can also be applied to the control method for the power supply system 103 of the fourth embodiment.

While embodiments of the present invention have been described above, the above-described embodiments only show part of application examples of the present invention and are not intended to limit the technical scope of the present invention to the specific configurations of the above-described embodiments.

In the first and second embodiments, the single MOSFET 40 is provided on the first path connected from the lithium-ion battery 4 to the lead-acid battery 3. However, the present invention is not limited to such a configuration. For example, on this first path, two MOSFETs 40 with body diodes facing each other may be provided or merely a single diode may be provided.

Where necessary, the control methods of the second to fourth embodiments can be combined and carried out as appropriate. Consequently, the control methods can be efficiently used while preventing degradation of the lead-acid battery 3 and the lithium-ion battery 4.

In the first to fourth embodiments, the lead-acid battery 3 and the lithium-ion battery 4 are configured to shift from the discharge phase to the charge phase based on the ratio (current ratio) between the discharge current of the lead-acid battery 3 and the discharge current of the lithium-ion battery 4. However, the present invention is not limited to such a configuration. For example, it may be configured that whether or not the first condition for shift timing from the discharge phase to the charge phase is established is determined based on the system current, i.e. the total current (total current amount) of the discharge current of the lead-acid battery 3 and the discharge current of the lithium-ion battery, and the difference (current difference) between the discharge current of the lead-acid battery 3 and the discharge current of the lithium-ion battery.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A power supply system that is mountable on a vehicle, comprising:
   a lead-acid storage battery connected to an electrical load;
   a lithium-ion storage battery having different charge and discharge characteristics form the lead-acid storage battery, and connected in parallel with the lead-acid storage battery with respect to the electrical load;
   a power generator configured to charge the lead-acid storage battery and the lithium-ion storage battery; and
   a controller configured to drive the power generator to switch from a discharge state in which both the lead-acid storage battery and the lithium-ion storage battery are discharged to a charge state in which both the lead-acid storage battery and the lithium-ion storage battery are charged, based on a relationship between a discharge current of the lead-acid storage battery and a discharge current of the lithium-ion storage battery.

2. The power supply system according to claim 1,
   wherein the controller comprises:
   a current value acquisition unit configured to acquire the discharge current of the lead-acid storage battery and the discharge current of the lithium-ion storage battery;
   a current value comparison unit configured to compare the discharge current of the lead-acid storage battery and the discharge current of the lithium-ion storage battery acquired by the current value acquisition unit; and
   a power generator controller configured to drive the power generator to charge the lead-acid storage battery and the lithium-ion storage battery based on a comparison result of the current value comparison unit.

3. The power supply system according to claim 2,
   wherein the current value comparison unit is configured to calculate a current ratio between the discharge current of the lead-acid storage battery and the discharge current of the lithium-ion storage battery; and
   wherein the power generator controller is configured to drive the power generator when a predetermined time has elapsed from when the current ratio has become equal to or less than a predetermined value.

4. The power supply system according to claim 3,
   wherein the power generator drives the power generator when the predetermined time has elapsed from when the current ratio has become equal to or less than the predetermined value and when the discharge current of the lithium-ion storage battery is greater than a first threshold value.

5. The power supply system according to claim 4,
   wherein the power generator controller drives the power generator even when the current ratio is greater than the predetermined value and when the discharge current of the lithium-ion storage battery is greater than a third threshold value that is greater than the first threshold value.

6. The power supply system according to claim 3,
   wherein the power generator controller drives the power generator even when the current ratio is greater than the predetermined value, and when the discharge current of the lead-acid storage battery is greater than a second threshold value.

7. The power supply system according to claim 6,
   wherein the power generator controller rives the power generator when the predetermined time has elapsed from when the current ratio has become equal to or less than the predetermined value and when the discharge current of the lithium-ion storage battery is greater than a first threshold value; and wherein the power generator controller drives the power generator even when the current ratio is greater than the predetermined value and when the discharge current of the lithium-ion storage battery is greater than a third threshold value that is greater than the first threshold value.

8. A method for controlling a power supply system, wherein the power supply system comprises:
a lead-acid storage battery,
a lithium-ion storage battery,
a power generator and being mountable on a vehicle, and
a controller,
the method comprising:
detecting a discharge current of the lead-acid storage battery;
detecting a discharge current of the lithium-ion storage battery; and
driving the power generator to switch from a discharge state in which both the lead-acid storage battery and the lithium-ion storage battery are discharged to a charge state in which both the lead-acid storage battery and the lithium-ion storage battery are charged, based on a relationship between the discharge current of the lead-acid storage battery and the discharge current of the lithium-ion storage battery.

* * * * *